(12) United States Patent
Sakakibara

(10) Patent No.: US 8,913,405 B2
(45) Date of Patent: Dec. 16, 2014

(54) POWER CONVERTING APPARATUS GENERATING A CARRIER HAVING A WAVEFORM IN WHICH AN ABSOLUTE VALUE OF A SLOPE IS CONSTANT WITH RESPECT TO TIME, BASED ON A VALUE FOR INTERNALLY DIVIDING AMPLITUDE OF THE WAVEFORM INTO FIRST AND SECOND VALUES

(75) Inventor: Kenichi Sakakibara, Kusatsu (JP)

(73) Assignee: Daikin Industries, Inc., Osaka (JP)

( * ) Notice: Subject to any disclaimer, the term of this patent is extended or adjusted under 35 U.S.C. 154(b) by 348 days.

(21) Appl. No.: 12/739,442

(22) PCT Filed: Oct. 21, 2008

(86) PCT No.: PCT/JP2008/069052
§ 371 (c)(1),
(2), (4) Date: Apr. 23, 2010

(87) PCT Pub. No.: WO2009/054380
PCT Pub. Date: Apr. 30, 2009

(65) Prior Publication Data
US 2010/0213769 A1     Aug. 26, 2010

(30) Foreign Application Priority Data

Oct. 24, 2007   (JP) ................................ 2007-276792

(51) Int. Cl.
    *H02M 5/451*          (2006.01)
    *H02M 5/458*          (2006.01)
    *H02M 5/297*          (2006.01)

(52) U.S. Cl.
    CPC ............ *H02M 5/4585* (2013.01); *H02M 5/297* (2013.01)
    USPC .............................................. 363/37; 363/34

(58) Field of Classification Search
    USPC ....................................................... 363/34–37
    See application file for complete search history.

(56) References Cited

U.S. PATENT DOCUMENTS 5,731,681 A * 3/1998 Inaniwa et al. ................ 318/729
5,949,664 A * 9/1999 Bernet et al. ..................... 363/37

(Continued)

FOREIGN PATENT DOCUMENTS

| JP | 3-107373 A | 5/1991 |
| JP | 2004-222337 A | 8/2004 |
| JP | 2004-222338 A | 8/2004 |
| JP | 2004-266972 A | 9/2004 |

OTHER PUBLICATIONS

Decision of Grant of corresponding Korean Application No. 9-52011-053734796 dated Sep. 21, 2011.

(Continued)

*Primary Examiner* — Adolf Berhane
*Assistant Examiner* — Gustavo Rosario Benitez
(74) *Attorney, Agent, or Firm* — Global IP Counselors

(57) ABSTRACT

A power converting apparatus generates a carrier having a waveform in which an absolute value of a slope is constant with respect to time, based on a value for internally dividing amplitude of the waveform into first and second values. Commutation of a converter is performed when the carrier takes a reference. Adoption is allowed of a zero voltage vector as a switching mode of an inverter in a period in which the carrier takes a first command value to a second command value. A value for internally dividing a value from the reference to a maximum value of the carrier at a ratio between a third value and a fourth value is the first command value. A value for internally dividing a value from a minimum value of the carrier to the reference at a ratio between the third value and the fourth value is the second command value.

18 Claims, 15 Drawing Sheets

(56) References Cited

U.S. PATENT DOCUMENTS

| | | | |
|---|---|---|---|
| 8,270,186 B2* | 9/2012 | Sakakibara | 363/37 |
| 2006/0133120 A1* | 6/2006 | Sato et al. | 363/37 |
| 2007/0069673 A1* | 3/2007 | Oyobe et al. | 318/376 |
| 2007/0268051 A1* | 11/2007 | Kerkman et al. | 327/175 |
| 2008/0055955 A1* | 3/2008 | Tamai et al. | 363/163 |
| 2008/0089444 A1* | 4/2008 | Shin et al. | 375/326 |
| 2008/0180054 A1* | 7/2008 | Kinpara et al. | 318/720 |

OTHER PUBLICATIONS

Koji Kato et al.; "Improvement of Waveform for a Boost type AC/DC/AC Direct Converter Focused on Input Current"; The Institute of Electrical Engineers of Japan Sangyo Oyo Bumon Taikai 2007; Japan, Aug. 20, 2007; 1-31, I-279-282.

Koji Kato; "Improvement of Waveform for a Boost type AC/DC/AC Direct Converter"; The Institute of Electrical Engineers of Japan National Convention, The 2007 Annual Meeting Record; Japan, Mar. 15, 2007; 4-098, pp. 153-154.

Lixiang Wei et al.; "A Novel Matrix Converter Topology with Simple Communication"; Department of Electrical and Computer Engineering University of Wisconsin-Madison; WI. 2001; vol. 3, pp. 1-6.

Takaharu Takeshita et al.; "PWM Scheme for Current Source Three-Phase Inverters and Converters"; University of Nagoya Institute of Technology; Japan 1996; vol. D-116, pp. 106-107.

* cited by examiner

F I G . 1
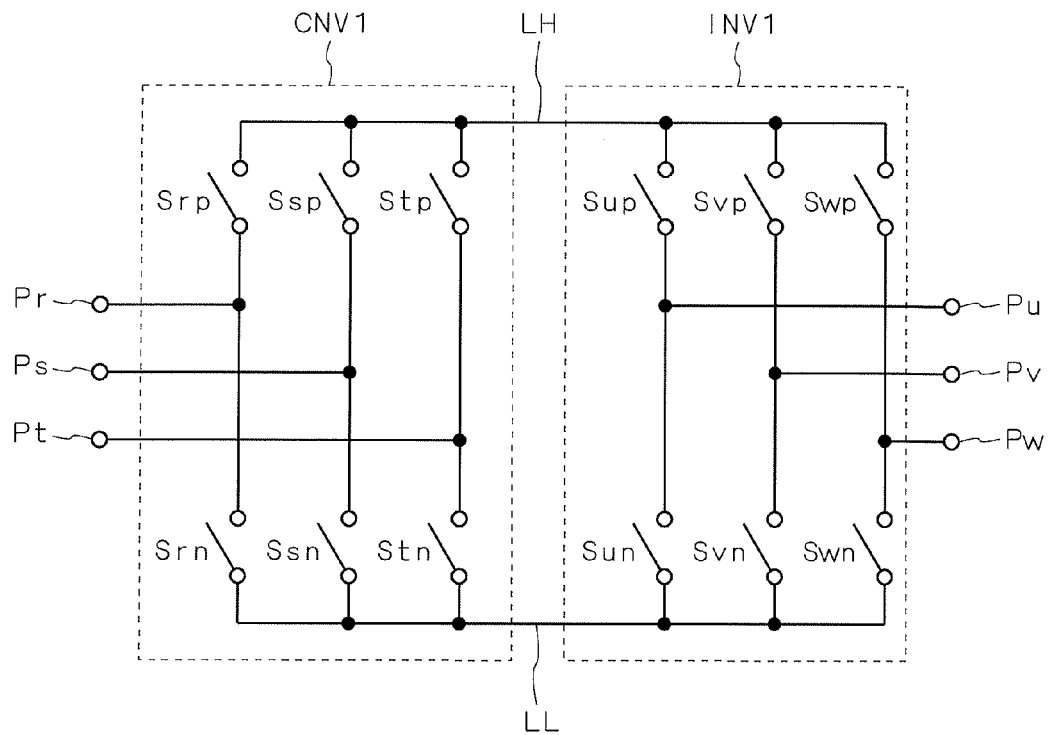
F I G . 2
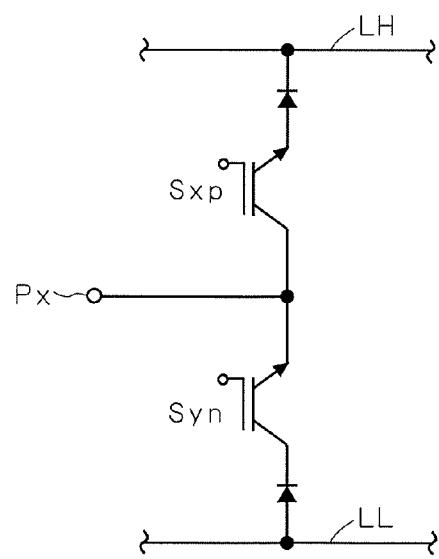

F I G . 3
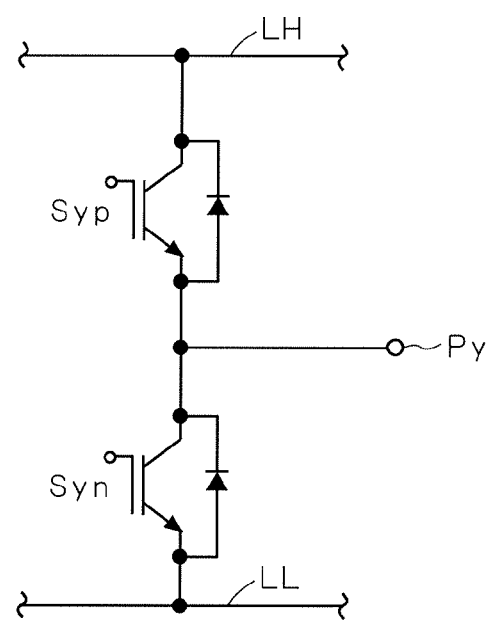

F I G . 9
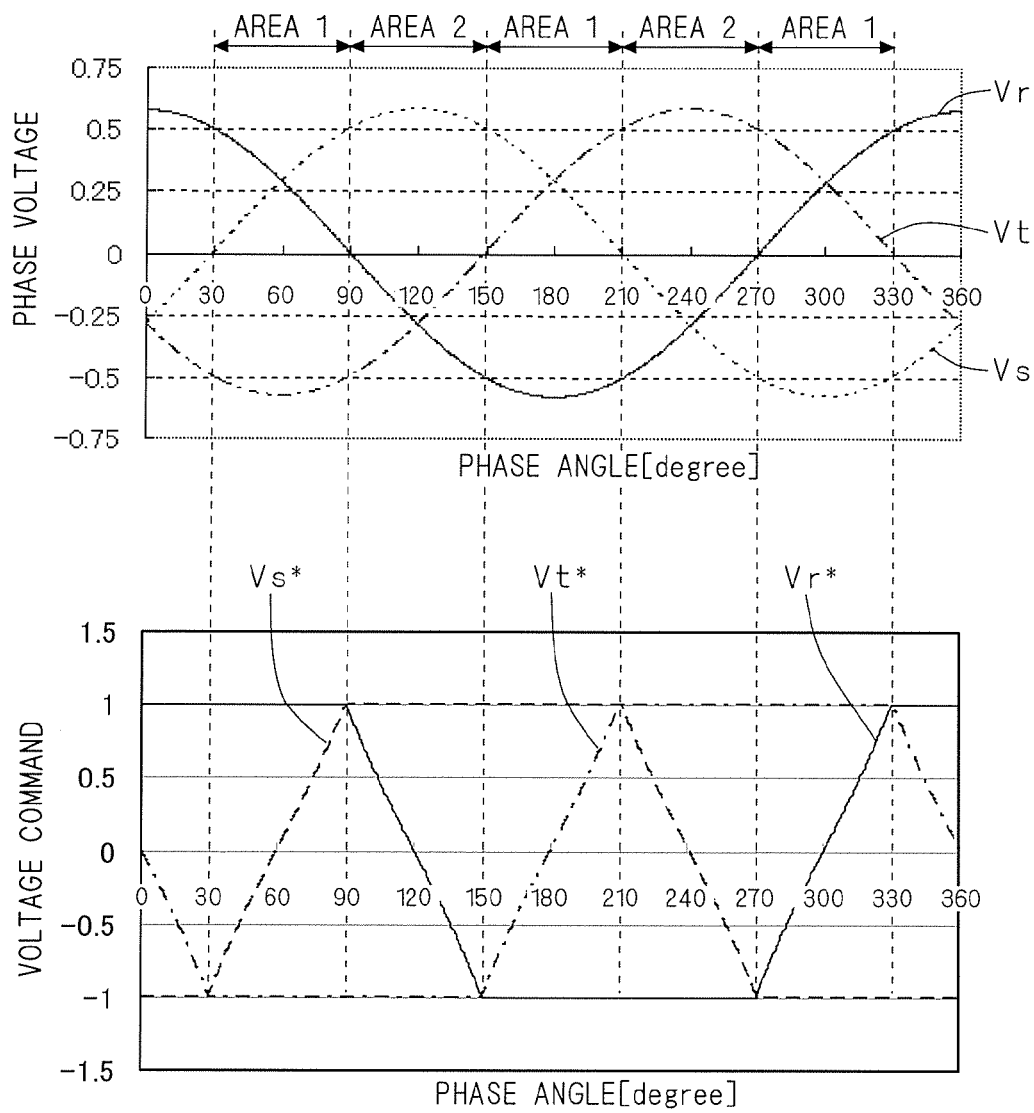

F I G . 1 0
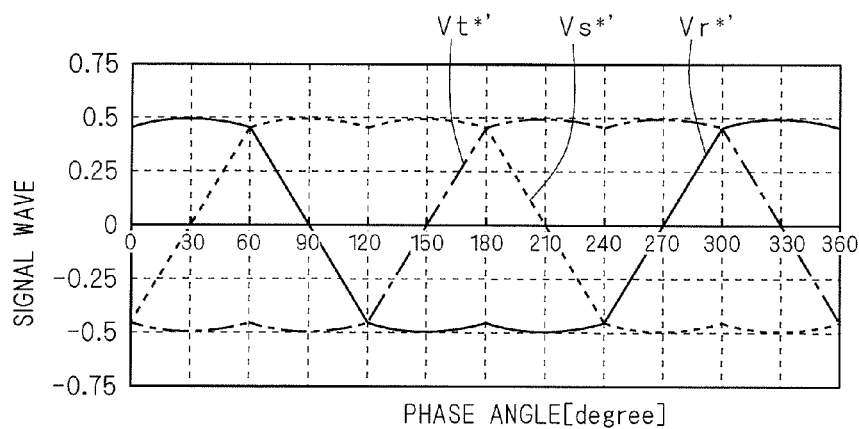
F I G . 1 1
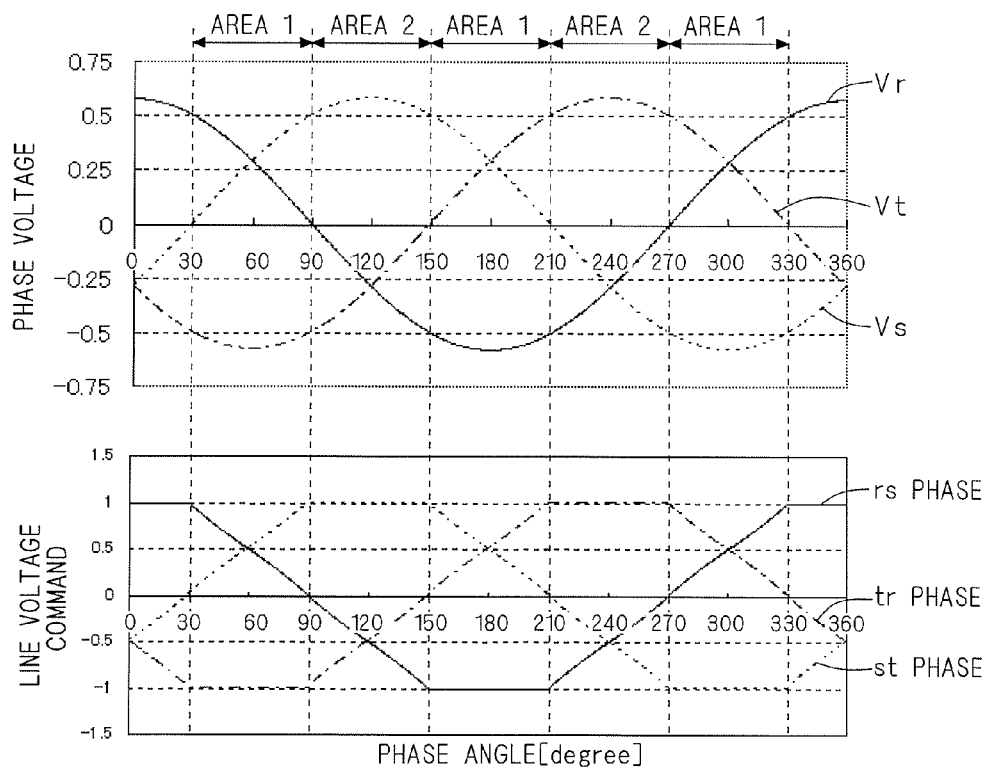

FIG. 12
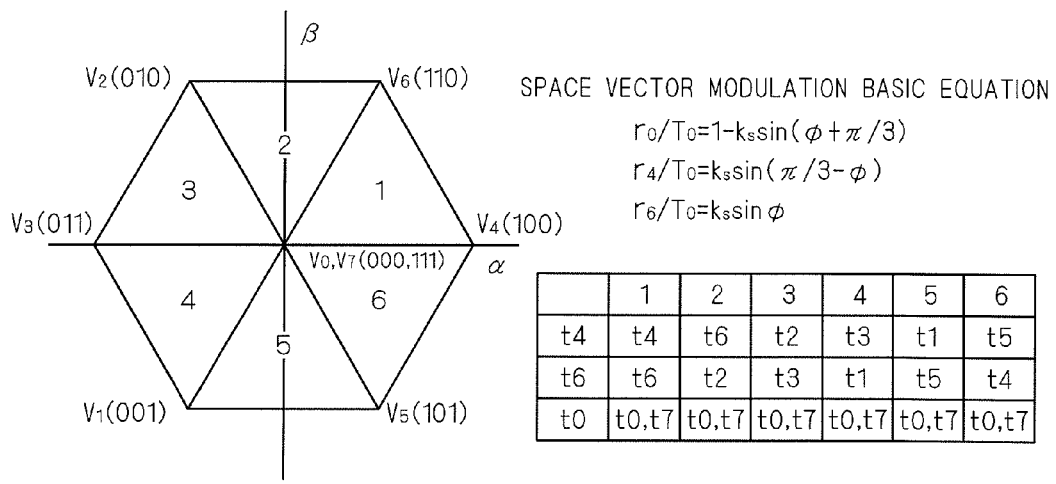
SPACE VECTOR MODULATION BASIC EQUATION
$r_0/T_0 = 1 - k_s \sin(\phi + \pi/3)$
$r_4/T_0 = k_s \sin(\pi/3 - \phi)$
$r_6/T_0 = k_s \sin\phi$
| | 1 | 2 | 3 | 4 | 5 | 6 |
|---|---|---|---|---|---|---|
| | t4 | t4 | t6 | t2 | t3 | t1 | t5 |
| | t6 | t6 | t2 | t3 | t1 | t5 | t4 |
| | t0 | t0,t7 | t0,t7 | t0,t7 | t0,t7 | t0,t7 | t0,t7 |
$V^*_r = 1 - 2(t_0/2T_0) = k_s \sin(\phi + \pi/3)$
$V^*_s = k_s \sin(\phi + \pi/3) - 2(t_4/T_0) = \sqrt{3} k_s \sin(\phi - \pi/6)$
$V^*_t = -1 + 2(t_0/2T_0) = -k_s \sin(\phi + \pi/3)$
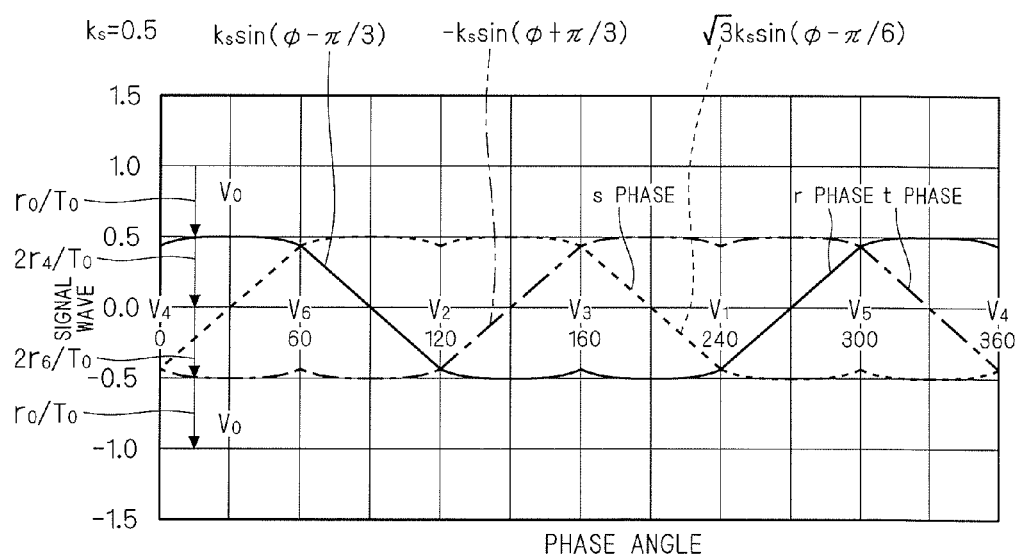

F I G . 1 3
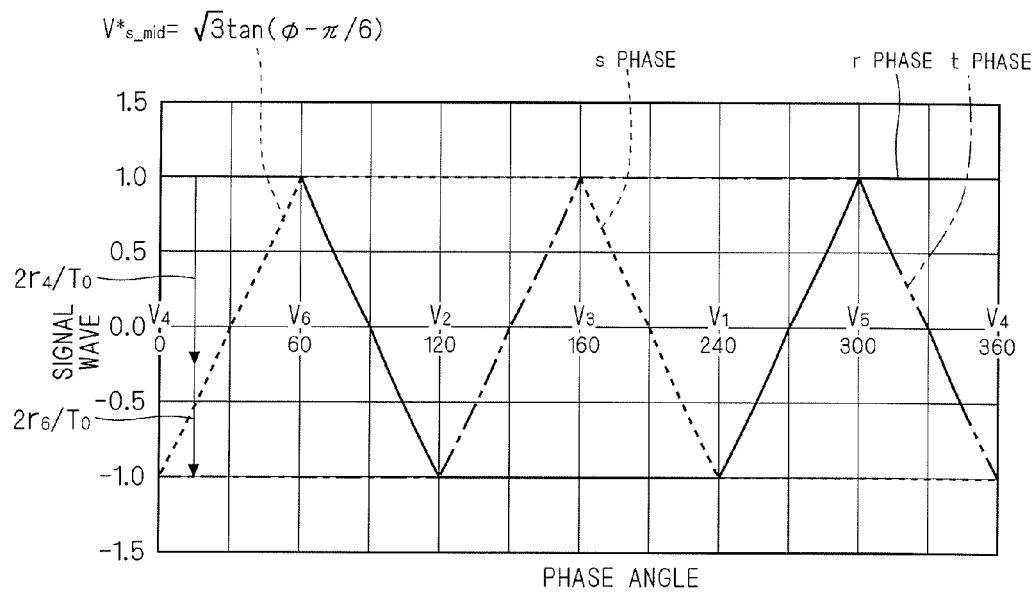
F I G . 1 4
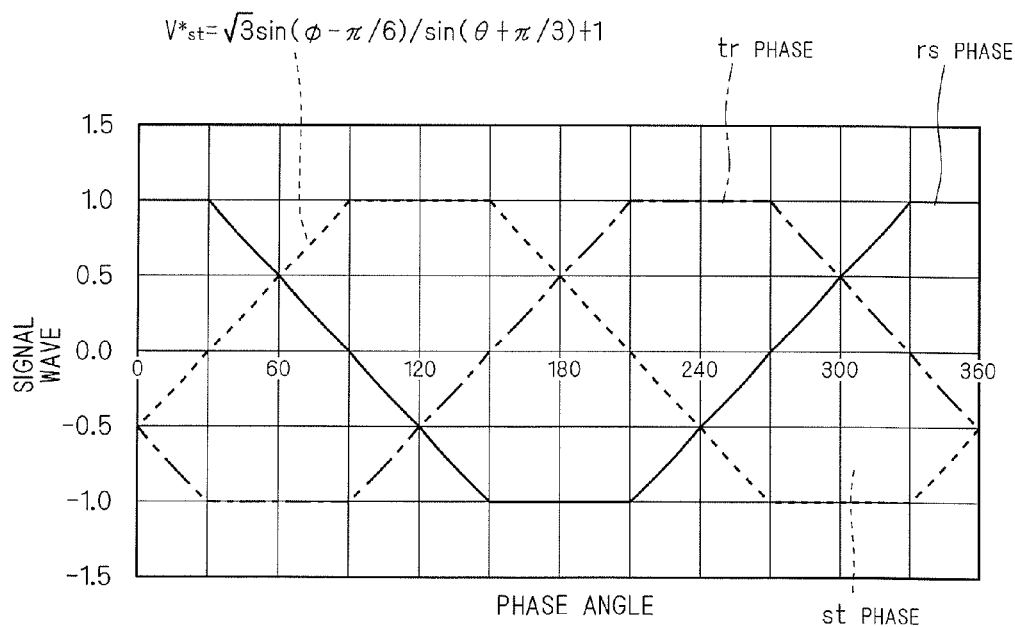

F I G . 1 5
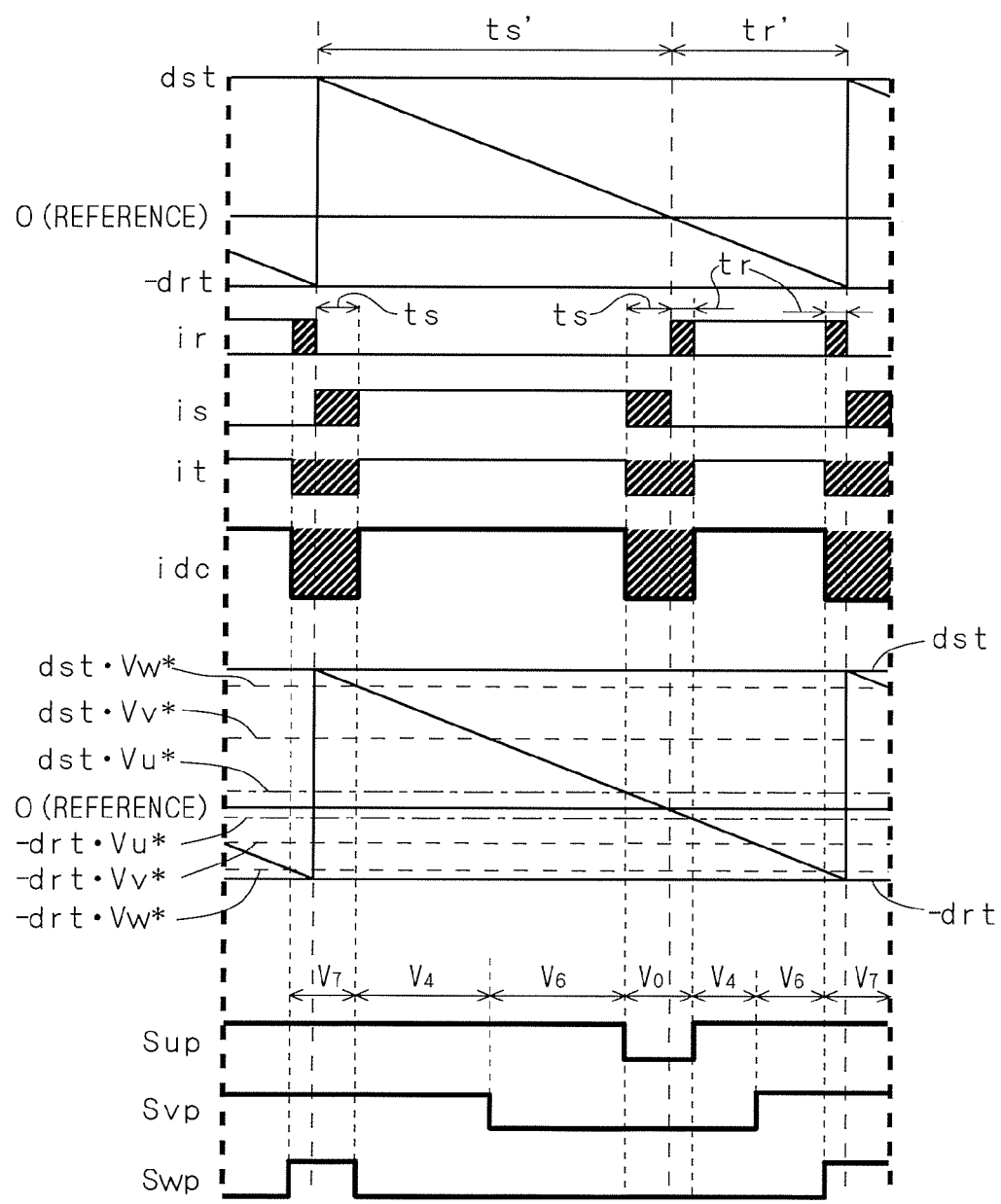

F I G . 1 6
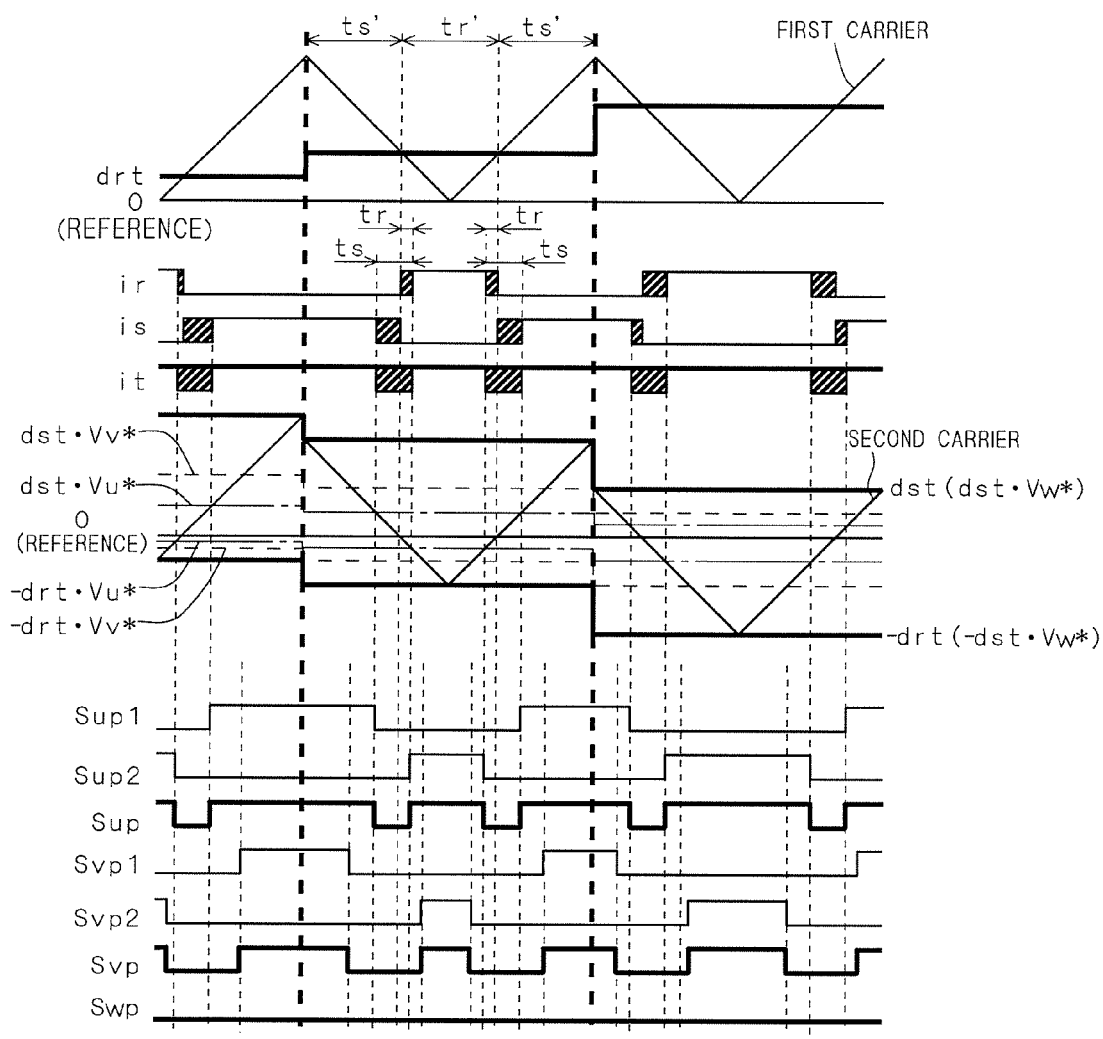

POWER CONVERTING APPARATUS GENERATING A CARRIER HAVING A WAVEFORM IN WHICH AN ABSOLUTE VALUE OF A SLOPE IS CONSTANT WITH RESPECT TO TIME, BASED ON A VALUE FOR INTERNALLY DIVIDING AMPLITUDE OF THE WAVEFORM INTO FIRST AND SECOND VALUES

CROSS-REFERENCE TO RELATED APPLICATIONS

This U.S. National stage application claims priority under 35 U.S.C. §119(a) to Japanese Patent Application No. 2007-276792, filed in Japan on Oct. 24, 2007, the entire contents of which are hereby incorporated herein by reference.

TECHNICAL FIELD

The present invention relates to a power converting apparatus, and for example, to a direct power converting apparatus which is not provided with power storing means in a DC link unit thereof.

BACKGROUND ART

There is the technology of performing, in a power converting apparatus which is not provided with power storing means in a DC link unit between a converter and an inverter thereof, a commutation of the converter side in a zero voltage vector period on the inverter side. That is, in the period when the inverter outputs zero voltage by a zero voltage vector, an output of the inverter is brought into a state of being short-circuited with only any one of a high potential side and a low potential side of the DC link unit, whereby current does not flow from the DC link unit to the inverter. Accordingly, in this period, input current of the converter does not flow as well, with the result that the converter is caused to perform commutation without generating loss resulting from switching.

In this technology, however, the period when the input current of the converter becomes zero is determined not by commutation of the converter, but by switching of the inverter. As a result, in a case where a single triangular wave carrier is merely used in commutation of the converter as well as switching of the inverter, in some cases, the zero vector on the inverter side affects the periods before and after the commutation of the converter in an asymmetrical manner, leading to distortion of an input current waveform.

Japanese Patent Application Laid-Open No. 2004-222337 discloses the technology for solving the aforementioned problem. In the power converting apparatus described in Japanese Patent Application Laid-Open No. 2004-222337, a peak position of a carrier on an inverter side is moved correspondingly to a ratio between ON and OFF periods of a phase in which the converter is switched, and in the ON period and OFF period of the phase, generation timing of a zero voltage period is controlled such that average current values of the DC link unit coincide with each other therebetween.

Japanese Patent Application Laid-Open No. 2004-266972 and Lixiang Wei and Thomas A. Lipo, "A novel matrix converter topology with simple commutation", IEEE IAS 2001, vol. 3, 2001, pp. 1749-1754 and Takaharu Takeshita, Koji Toyama, Nobuyuki Matsui, "PWM scheme for current source three-phase inverters and converters", IEEF Transactions on Industry Applications, Vol. 116, No. 1, 1996, pp. 106 and 107 disclose the technologies related to the present invention.

SUMMARY

Problem to be Solved by the Invention

However, in the technology described in Japanese Patent Application Laid-Open No. 2004-222337, a carrier on the inverter side needs to be transformed, which complicates generation thereof. In addition, carriers are required to be applied individually in the converter and the inverter.

An object of the present invention is therefore to provide a power converting apparatus capable of suppressing distortion of an input current waveform while using a single carrier.

Means to Solve the Problem

According to a first aspect of the present invention, a power converting apparatus includes: three input terminals (Pr, Ps, Pt) respectively receiving a phase voltage of three-phase AC; three output terminals (Pu, Pv, Pw); first and second DC power supply lines (LH, LL); a converter (CNV1) including a first switch device group including three switch devices (Srp, Ssp, Stp) connected between each of the input terminals and the first DC power supply line and three switch devices (Srn, Ssn, Stn) connected between each of the input terminals and the second DC power supply line; an inverter (INV1) including a second switch device group including three switch devices (Sup, Svp, Swp) connected between each of the output terminals and the first DC power supply line and three switch devices (Sun, Svn, Swn) connected between each of the output terminals and the second DC power supply line; a carrier generating unit (32) generating a carrier having a waveform in which an absolute value of a slope is constant with respect to time, based on a value for internally dividing an amplitude of the waveform into a first value (drt) and a second value (dst); converter gate signal generating units (11 to 16) performing commutation of the converter at a timing at which the carrier takes the reference; and inverter gate signal generating units (21 to 26), where a value for internally dividing a value from the reference to a maximum value of the carrier at a ratio between the third value (Vu*) and the fourth value (1−Vu*) is a first command value (dst·Vu*) and a value for internally dividing a value from a minimum value of the carrier to the reference at a ratio between the third value and the fourth value is a second command value (−drt·Vu*), allowing adoption of a zero voltage vector as a switching mode of the inverter in a period in which the carrier takes the first command value to the second command value.

According to a second aspect of the power converting apparatus of the present invention, in the power converting apparatus of the first aspect, the converter gate signal generating unit compares the carrier and a current command having a trapezoidal wave shape for determining a ratio between the first value and the second value to perform commutation of the converter; and a slope area of the current command is expressed by: |ds*|=(1+√3 tan(ø−π/6))/2; and |dt*|=(1−√3 tan(ø−π/6))/2, where ds* and dt* represent a line current conduction rate, a phase angle ø is 0≤ø≤π/3, and ø represents a phase in an area obtained by equally dividing one cycle of a command signal phase θ into six.

According to a third aspect of the power converting apparatus of the present invention, in the power converting apparatus according to the first aspect, the converter gate signal generating unit converts a voltage-source switch signal obtained by comparing the carrier and a voltage command having a trapezoidal wave shape for determining a ratio between the first value and the second value into a current-source switch signal and supplies to the converter, to thereby perform commutation of the converter; and a slope area of the voltage command is expressed by: $\sqrt{3}\tan(\phi-\pi/6)$, where a phase angle ø is $\pi/6 \leq \theta \leq \pi/2$; and $-\sqrt{3}\tan(\phi-\pi/6)$, where a phase angle ø is $7\pi/6 \leq \theta \leq 3\pi/2$, and ø represents a phase in an area obtained by equally dividing one cycle of a command signal phase θ into six.

According to a fourth aspect of the present invention, a power converting apparatus includes: three input terminals (Pr, Ps, Pt) respectively receiving phase voltages; three output terminals (Pu, Pv, Pw); a direct converter including three switch devices (Sur, Sus, Sut) provided between each of the three input terminals and the first one of the output terminals, three switch devices (Svr, Svs, Svt) provided between each of the three input terminals and the second one of the output terminals, and three switch devices (Swr, Sws, Swt) provided between each of the three input terminals and the third one of the output terminals; a carrier generating unit (32) generating a carrier having a waveform in which an absolute value of a slope is constant with respect to time, based on a value for internally dividing an amplitude of the waveform into a first value (drt) and a second value (dst); and control units (11 to 14, 21 to 26, 33) outputting, to the switch devices, a third switch signal computed by performing matrix transform on a first switch signal and a second switch signal, wherein: in the control units, first and second virtual DC power supply lines (LH, LL), a virtual converter (CNV1) and a virtual inverter (INV1) are assumed, the virtual converter including: three virtual switch devices (Srp, Ssp, Stp) connected between each of the input terminals and the first virtual DC power supply line; and three virtual switch devices (Srn, Ssn, Stn) connected between each of the input terminals and the second virtual DC power supply line, the virtual inverter including: three virtual switch devices (Sup, Svp, Swp) connected between each of the output terminals and the first virtual DC power supply line; and three virtual switch devices (Sun, Svn, Swn) connected between each of the output terminals and the second DC power supply line; the first switch signal is a signal for performing commutation of the virtual converter at a timing at which the carrier takes the reference; and the second switch signal, where a value for internally dividing a value from the reference to a maximum value of the carrier at a ratio between a third value (Vu*) and the fourth value (1-Vu*) is a first command value (dst·Vu*) and a value for internally dividing a value from a minimum value of the carrier to the reference at a ratio between the third value and the fourth value is a second command value (-drt·Vu*), allowing adoption of a zero voltage vector as a switching mode of the virtual inverter in a period in which the carrier takes the first command value to the second command value.

According to a fifth aspect of the power converting apparatus of the present invention, in the power converting apparatus according to the fourth aspect, the first switch signal is generated by comparing the carrier and a current command having a trapezoidal wave shape; and a slope area of the current command is expressed by: $|ds^*|=(1+\sqrt{3}\tan(\phi-\pi/6))/2$; and $|dt^*|=(1-\sqrt{3}\tan(\phi-\pi/6))/2$, where ds* and dt* represent a line current conduction rate, a phase angle is $0/\leq\phi\leq\pi/3$, and ø represents a phase in an area obtained by equally dividing one cycle of a command signal phase θ into six.

According to a sixth aspect of the power converting apparatus of the present invention, in the power converting apparatus according to the fourth aspect, the first switch signal is generated by converting a voltage-source third switch signal into a current-source fourth switch signal, the voltage-source third switch signal being obtained by comparing the carrier and a voltage command having a trapezoidal wave shape for determining a ratio between the first value and the second value; and a slope area of the voltage command is expressed by: $\sqrt{3}\tan(\phi-\pi/6)$, where a phase angle is $\pi/6 \leq \theta \leq \pi/2$; and $-\sqrt{3}\tan(\phi-\pi/6)$, where a phase angle ø is $\pi/6 \leq \theta \leq 3\pi/2$, and ø represents a phase in an area obtained by equally dividing one cycle of a command signal phase θ into six.

According to a seventh aspect of the power converting apparatus of the present invention, in the power converting apparatus according to the first to sixth aspects, the carrier is a triangular-wave-shape carrier.

According to an eighth aspect of the power converting apparatus of the present invention, in the power converting apparatus according to the first to sixth aspects, the carrier is a sawtooth-wave-shape carrier.

Effects of the Invention

According to the first aspect of the power converting apparatus of the present invention, before and after the timing at which the converter side is subjected to commutation, the period in which the zero voltage vector is generated equally acts on the current before commutation and the current after commutation. Accordingly, it is possible to suppress distortion of the input current using a single carrier.

According to the second or third aspect of the power converting apparatus of the present invention, the input current is capable of having a sine wave.

According to the fourth aspect of the power converting apparatus of the present invention, before and after the timing at which the virtual converter side is subjected to commutation, the period in which the zero voltage vector is generated equally acts on the current before commutation and the current after commutation. Accordingly, it is possible to suppress distortion of the input current using a single carrier.

According to the fifth or sixth aspect of the power converting apparatus of the present invention, the input current is capable of having a sine wave.

According to the seventh aspect of the power converting apparatus of the present invention, a triangular-wave-shape signal suitable for PWM modulation is used for a carrier signal, which simplifies a circuit for pulse wave modulation.

According to the eighth aspect of the power converting apparatus of the present invention, a sawtooth-wave-shape signal is used for a carrier signal, which simplifies carrier generation and modulation processing. These and other objects, features, aspects and advantages of the present invention will become more apparent from the following detailed description of the present invention when taken in conjunction with the accompanying drawings.

BRIEF DESCRIPTION OF DRAWINGS

FIG. 1 is a configuration diagram showing a conceptual example of a power converting apparatus according to a first embodiment;

FIG. 2 is a configuration diagram showing an example of switch devices included in a current-source converter;

FIG. 3 is a configuration diagram showing an example of switch devices included in a voltage-source inverter;

FIGS. 9 and 10 are figures showing a phase voltage and a voltage command;

FIG. 11 is a figure showing a phase voltage and a line voltage command;

FIG. 12 is a figure for describing space vector modulation;

FIG. 13 is a figure showing a trapezoidal wave modulation waveform (phase voltage) in space vector modulation;

FIG. 14 is a figure showing a trapezoidal wave modulation waveform (line voltage) in space vector modulation;

FIGS. 15 and 16 are still other figures showing a carrier, input currents, a current flowing through the DC power supply lines, and switching signals supplied to the inverter;

DETAILED DESCRIPTION OF EMBODIMENT(S)

First Embodiment

FIGS. 1 to 4 are configuration diagrams showing a conceptual example of a power converting apparatus according to a first embodiment. First, with reference to FIG. 1, the power converting apparatus includes three input terminals Pr, Ps and Pt, three output terminals Pu, Pv and Pw, DC power supply lines LH and LL, a converter CNV1, and an inverter INV1. Note that this power converting apparatus is a power converting apparatus which does not include power storing means such as a capacitor in the DC power supply lines LH and LL.

Phase voltages Vr, Vs and Vt of three-phase AC are input to the input terminals Pr, Ps and Pt, respectively. More specifically, for example, a three-phase AC power supply is connected to the input terminals Pr, Ps and Pt.

The converter CNV1 includes switch devices Srp, Ssp, Stp, Srn, Ssn and Stn. Three switch devices Srp, Ssp and Stp are connected between the DC power supply line LH and each of the input terminals Pr, Ps and Pt. Three switch devices Srn, Ssn and Stn are connected between the DC power supply line LL and each of the input terminals Pr, Ps and Pt.

Those switch devices Srp, Ssp, Stp, Srn, Ssn and Stn are supplied with switch signals generated by pulse width modulation (PWM) modulation by a control unit 1 which will be described below, and conduction/nonconduction thereof is controlled. Then, the converter CNV1 converts the three-phase AC voltage input from the input terminals Pr, Ps and Pt into a DC voltage, and outputs this between the DC power supply lines LH and LL. Those switch devices may be configured as shown in, for example, FIG. 2, such that high-speed diodes and IGBTs are connected in series with each other. Here, a letter x represents letters r, s and t.

The inverter INV1 includes switch devices Sup, Svp, Swp, Sun, Svn and Swn. Three switch devices Sup, Svp and Swp are connected between the DC power supply line LH and each of the output terminals Pu, Pv and Pw. Three switch devices Sun, Svn and Swn are connected between the DC power supply line LL and each of the output terminals Pu, Pv and Pw.

Those switch devices Sup, Svp, Swp, Sun, Svn and Swn are supplied with switch signals generated by PWM modulation by the control unit 1 which will be described below, and conduction/nonconduction thereof is controlled. Then, through this control, the inverter INV1 converts the DC voltage applied between the DC power supply lines LH and LL into a three-phase AC voltage, and outputs this to the output terminals Pu, Pv and Pw. Those switch devices may employ IGBTs each provided with a freewheeling diode, as shown in, for example, FIG. 3. Here, a letter y represents letters u, v and w.

Figure 4:
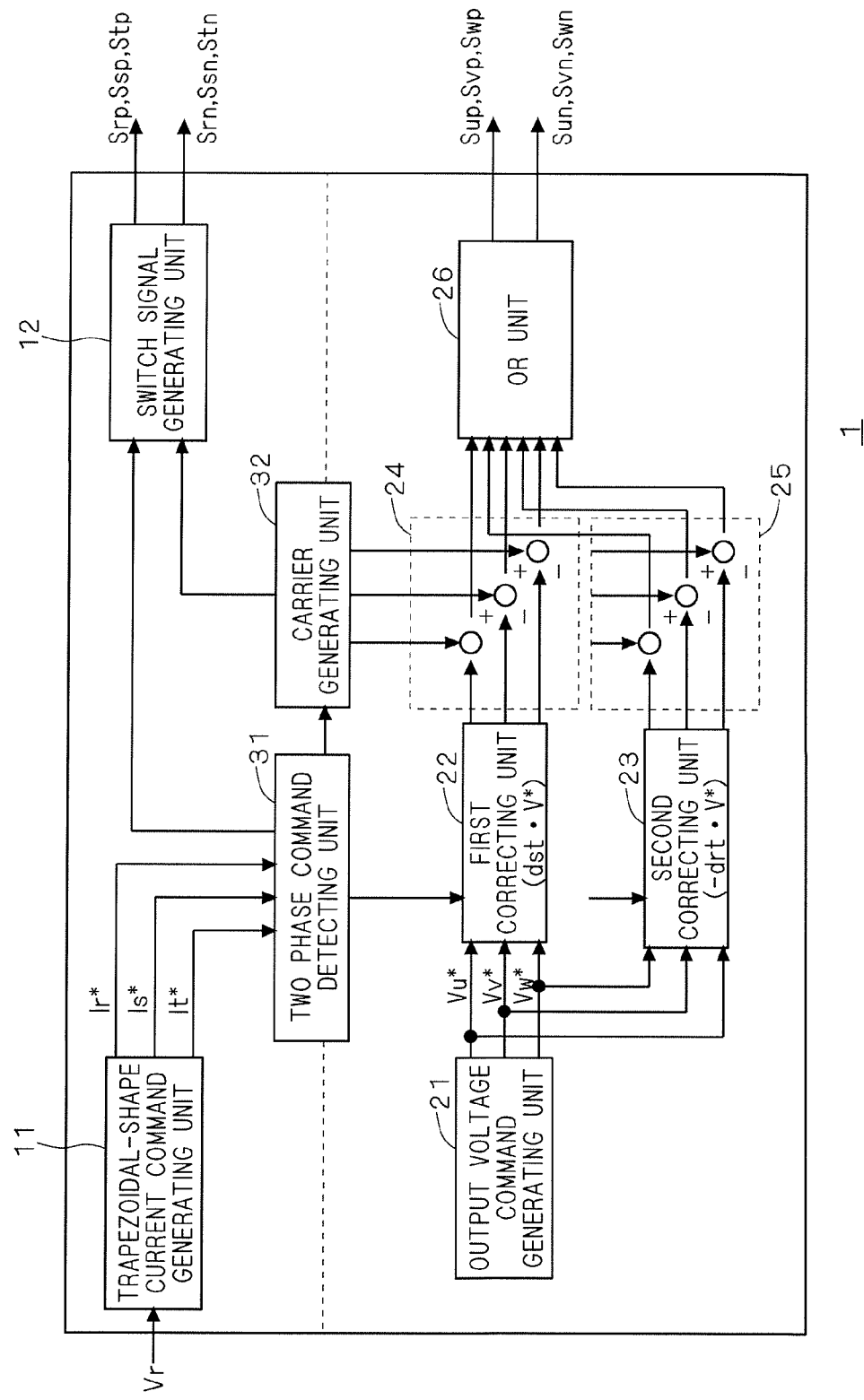
FIG. 4 is a configuration diagram showing a conceptual example of a control unit according to the first embodiment.

FIG. 4 is a configuration diagram showing a conceptual example of the control unit 1. The control unit 1 includes a current command generating unit 11, a switch signal generating unit 12, an output voltage command generating unit 21, a first correcting unit 22, a second correcting unit 23, comparators 24 and 25, an OR unit 26, a two phase command detecting unit 31 and a carrier generating unit 32.

First, how the control unit 1 controls the switch devices in the converter CNV1 will be described, and then description will be given of respective components contributing to the control. Next, how the control unit 1 controls the switch devices in the inverter INV1 will be described, and then description will be given of respective components contributing to the control.

Figure 5:
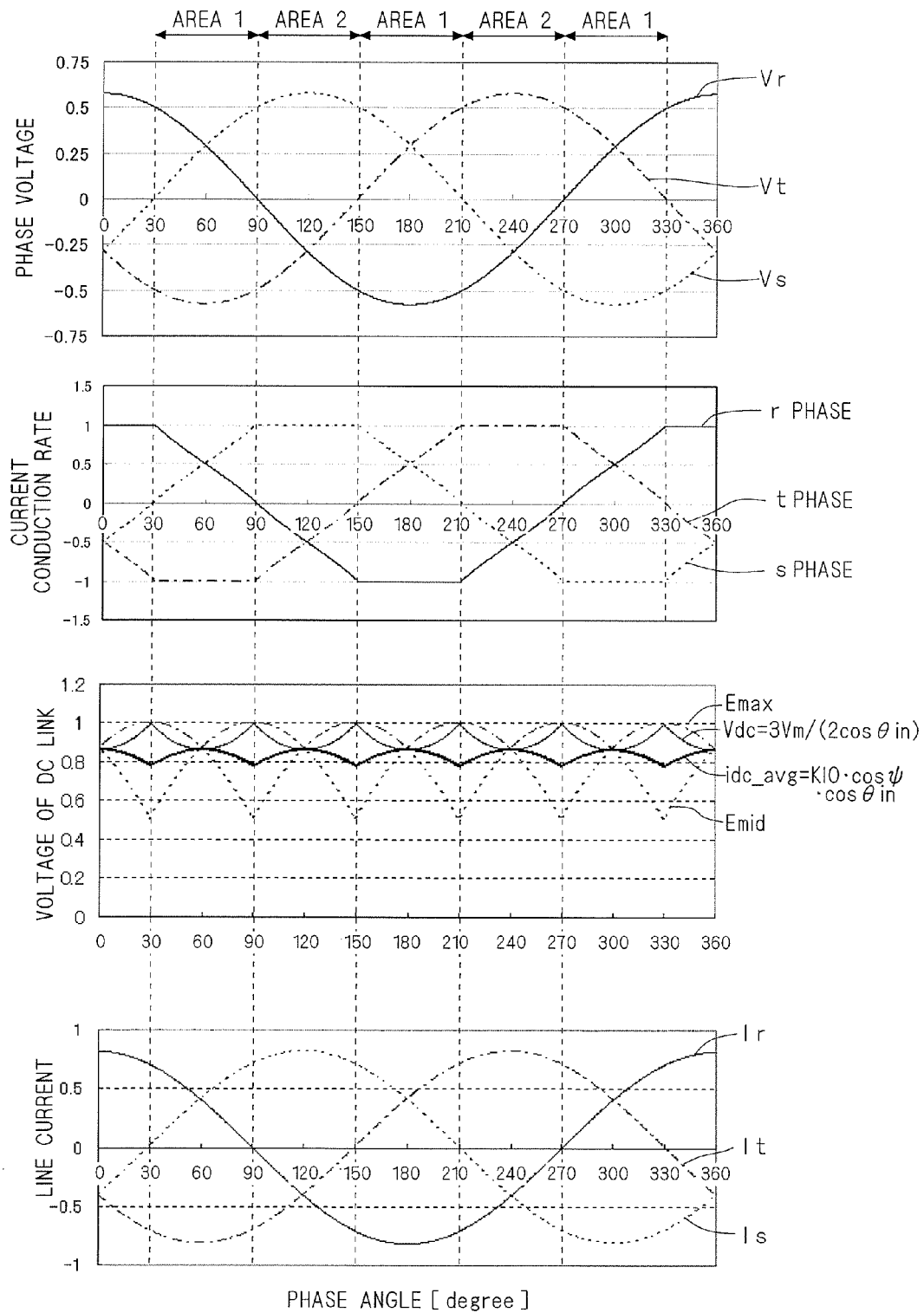
FIG. 5 is a figure showing a phase voltage and a current conduction rate.

FIG. 5 shows an example of phase voltages Vr, Vs and Vt input to the input terminals Pr, Ps and Pt, respectively, current conduction rates (duties) of respective phases, a voltage between the DC power supply lines LH and LL, and input currents Ir, Is and It. The phase voltages Vr, Vs and Vt are normalized by a line voltage, where amplitudes thereof are Vm=1/√3. Each of the phase voltages Vr, Vs and Vt is classified into any area of an area 1 in which two phase voltages are positive and a remaining one phase voltage is negative and an area 2 in which two phase voltages are negative and a remaining one phase voltage is positive. Those areas 1 and 2 appear repeatedly for every 60 degrees of a phase angle in an alternating manner.

As a switching mode of the converter, in the areas 1 and 2, the switch devices are always brought into conduction in a phase in which positive and negative polarities of the phase voltage are single (phase in which an absolute value of the phase voltage is the largest), whereas the switch devices are brought into conduction at a predetermined current conduction rate in two phases having the same positive and negative polarities with each other.

More specific description will be given of the area 1 by taking an area where a phase angle is 30 degrees to 90 degrees as an example. In this area, a t-phase is the minimum phase, an absolute value of the phase voltage thereof is the largest, and the polarity of the phase voltage thereof is negative, whereby the switch device Stn is always brought into conduction. In the other phases, an r-phase and an s-phase, the polarities of the phase voltages are positive, and thus the switch devices Srp and Ssp are brought into conduction in an exclusive manner at current conduction rates drt and dst described below, respectively:

$$drt=\cos\theta r/|\cos\theta t|, dst=\cos\theta s/|\cos\theta t| \quad (1)$$

where θr, θs and θt are phases of the phase voltages Vr, Vs and Vt, respectively.

Further, the area 2 will be described by taking an area where a phase angle is 90 degrees to 150 degrees as an example. In this area, the s-phase is the maximum phase, the absolute value thereof is the largest, and the polarity of the phase voltage thereof is positive, whereby the switch device Ssp is always brought into conduction. In the other phases, the r-phase and the t-phase, the polarities of the phase voltages are negative, and thus the switch devices Srn and Stn are brought into conduction in an exclusive manner at respective predetermined current conduction rates.

FIG. 5 shows the aforementioned current conduction rates, where the duties of the switch devices Srp, Ssp and Stp are shown in the case where the current conduction rate is positive, while the duties of the switch devices Srn, Ssn and Stn are shown in the case where the current conduction rate is negative. As illustrated above, in the phase corresponding to the minimum phase, the current conduction rate is −1 because the switch devices connected to the DC power supply line LL are always brought into conduction, whereas in the phase corresponding to the maximum phase, the current conduction rate is 1 because the switch devices connected to the DC power supply line LH are always brought into conduction.

Note that the table below shows the switch device which is always brought into conduction and the switch devices which are brought into conduction by being exclusively switched therebetween in the area for each 60 degrees of a phase angle.

TABLE 1

| | Phase angle | | | | | | |
|---|---|---|---|---|---|---|---|
| | 0 to 30 | 30 to 90 | 90 to 150 | 150 to 210 | 210 to 270 | 270 to 330 | 330 to 360 |
| Conduction all the time | Srp | Stn | Ssp | Srn | Stp | Ssn | Srp |
| Conduction/Non-conduction | Ssn Stn | Srp Ssp | Srn Stn | Ssp Stp | Srn Ssn | Srp Stp | Ssn Stn |

The switch device corresponding to the maximum phase and the minimum phase is always brought into conduction, and thus a voltage applied between the DC power supply lines LH and LL (hereinafter, referred to as DC link voltage) has two potentials of a line voltage Emax between the maximum phase and the minimum phase, and a line voltage Emid between the minimum phase and a middle phase (area 1) or between the maximum phase and the middle phase (area 2). An average value Vdc of the DC link voltage is obtained by multiplying respective current conduction rates, which is expressed as follows. Switching is made at the aforementioned current conduction rate, whereby the DC link voltage takes a pulsating-current-shape voltage waveform.

$$Vdc = 3Vm/(2\cos\theta in)$$

$$\cos\theta in = \max(|\cos\theta r|, |\cos\theta s|, |\cos\theta t|) \quad (2)$$

On the inverter INV1 side, control is performed using this voltage Vdc as an input. Voltage is controlled so as to compensate an amount of pulsating current on the inverter INV1 side, and thus energization time is multiplied by $\cos\theta in$ which is an amount of pulsating current. Further, a load of the inverter INV1 is inductive, which is considered to be a current source. Therefore, a current idc_avg flowing through the DC power supply lines LH and LL is expressed by $k \cdot I0 \cdot \cos\psi \cdot \cos\theta in$, where I0 represents an amplitude of an output current of the inverter. Note that k represents a modulation factor, where $0 < k < \sqrt{3}/2$, and $\psi$ represents a phase difference between output voltage and output current.

On the converter CNV1 side, one phase is in a conduction state, while two phases are switched at respective current conduction rates. Accordingly, for example, in the area where a phase angle is 30 degrees to 90 degrees, input currents ir, is and it of the respective phases are expressed as follows.

$$ir = drt \cdot idc\_avg = k \cdot I0 \cdot \cos\psi \cdot \cos\theta r \quad (3)$$

$$is = dst \cdot idc\_avg = k \cdot I0 \cdot \cos\psi \cdot \cos\theta s \quad (4)$$

$$it = -idc\_avg = k \cdot I0 \cdot \cos\psi \cdot \cos\theta t \quad (5)$$

A similar result is obtained as to other phase angle, and thus as shown in FIG. 5, the input currents ir, is and it can take a sine wave.

Next, description will be given of an example of specific components contributing to the switching operation as described above on the converter CNV1 side. The current command generating unit 11 receives a power supply synchronization signal Vr, and generates, based on the power supply synchronization signal Vr, trapezoidal-wave-shape current commands Ir*, Is* and It* for the r-phase, s-phase and t-shape, respectively. Waveforms of the current commands Ir*, Is* and It* show the same shapes of the current conduction rates expressed by Equation (1) and shown in FIG. 5. Specific function forms of those waveforms will be described below.

The two phase command detecting unit 31 detects, from the current commands Ir*, Is* and It*, polarities of the phase voltages and current conduction rates of two phases other than the phase in which the absolute value of the phase voltage becomes the largest among the r-phase, s-phase and t-phase. For example, with reference to FIG. 5, in the area where the phase angle is 30 degrees to 90 degrees, the two phase command detecting unit 31 detects the polarities of the phase voltages Vr, Vs and Vt, and detects the current conduction rates drt and dst of the r-phase and s-phase, respectively, as the phases other than the phase in which the absolute value of the phase voltage becomes the largest.

Figure 6:
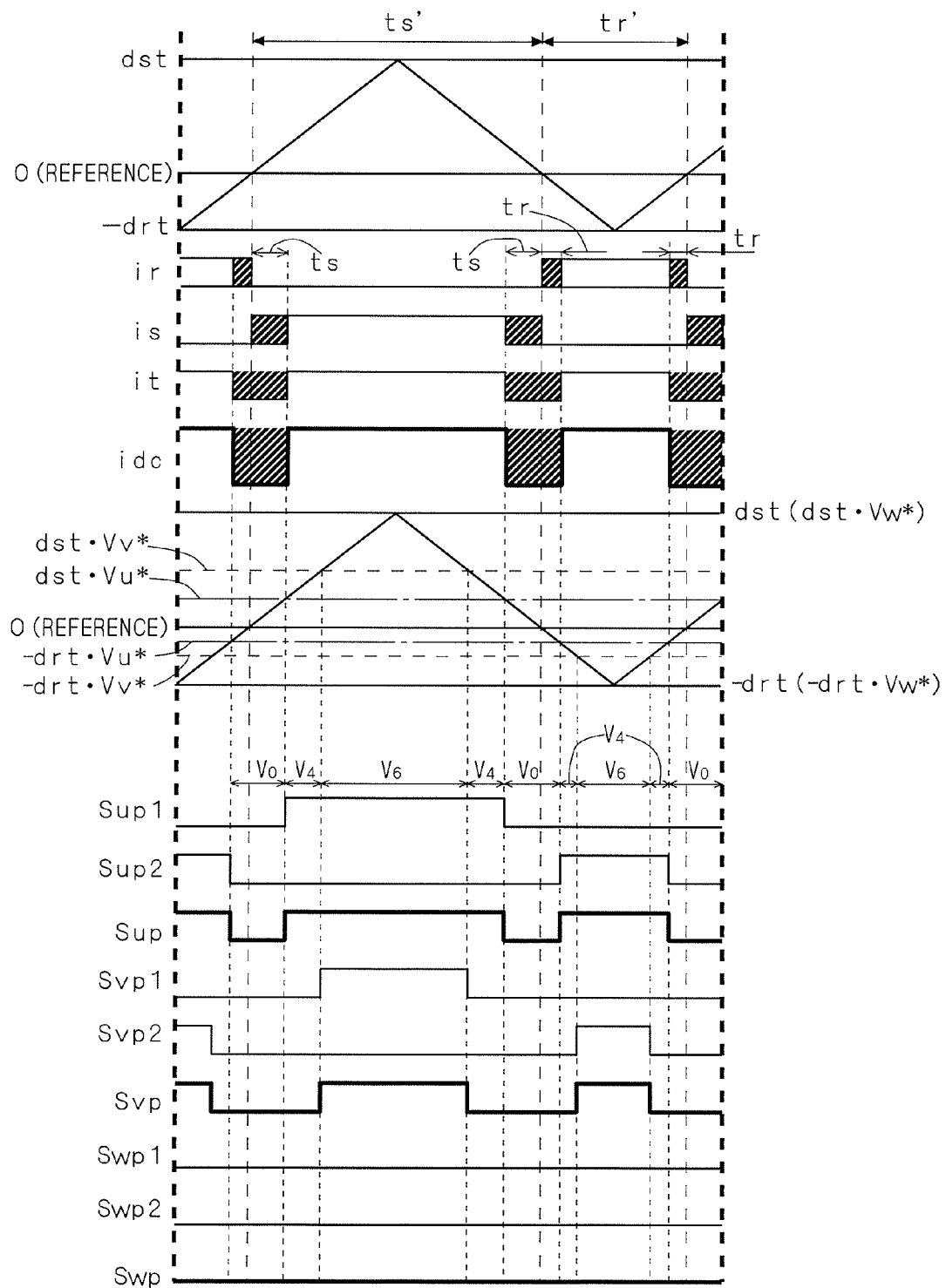
FIGS. 6 and 7 are figures showing a carrier, input currents, a current flowing through DC power supply lines, and switch signals supplied to an inverter.

The carrier generating unit 32 generates a carrier. More specific description will be given with reference to FIG. 6. FIG. 6 shows a relationship among the carrier generated by the carrier generating unit 32, the input currents ir, is and it (in the figure, absolute values are shown) flowing through the r-phase, s-phase and t-phase, respectively, the current idc flowing through the DC power supply lines LH and LL, and switch signals supplied to the inverter INV1. FIG. 6 shows a carrier for approximately one cycle within the area where the phase angle is 30 degrees to 90 degrees, which is shown in FIG. 5. Note that the cycle of the carrier is smaller than the cycle of an AC voltage input to the input terminals Pr, Ps and Pt, and thus the current conduction rates drt and dst and output current commands Iu*, Iv* and Iw* described below are approximated so as to be constant in one carrier cycle.

The carrier generating unit 32 receives the current conduction rate drt (or dst) from the two phase command detecting unit 31, and generates a carrier showing a (for example, triangular-wave-shape) waveform in which a slope is constant with respect to time. In an amplitude of the waveform of the carrier (in this case, peak-to-peak thereof is normalized to 1), a value for internally dividing into the current conduction rates of two phases (for example, drt and dst) other than the phase in which the absolute value of the phase voltage becomes the largest is assumed to be a reference (for example, zero). The peak-to-peak amplitude of the waveform of the carrier and the sum of the current conduction rates drt and dst are the same, which is one. Accordingly, the carrier in which the minimum value of the waveform value is the reference (for example, zero) may be temporarily generated, to thereby offset the carrier in a negative direction of an amplitude direction by an amount of, for example, the current conduction rate drt.

The switch signal generating unit 12 receives the polarity (which may be detected as the opposite polarity to the polarities of two phase for detecting the current conduction rate) of the phase in which the absolute value of the phase voltage becomes the largest from the two phase command detecting unit 31. In a case where the phase in which the absolute value of the phase voltage has a positive polarity, the switching signal generating unit 12 brings, as to this phase, the switch devices connected to the DC power supply line LH into conduction. On the other hand, in a case where the phase in which the absolute value of the phase voltage has a negative polarity, the switching signal generating unit 12 brings, as to this phase, the switch devices connected to the DC power supply line LL into conduction. Moreover, as to the phases other than the phase in which the absolute value of the phase voltage becomes the largest, based on positive/negative polarity thereof and the comparison of carrier with the reference, the switch signal generating unit 12 brings the switch devices into conduction.

More specifically, the switch signal generating unit 12 always brings, as to, for example, the t-phase which is the minimum phase (where the absolute value of the phase voltage becomes the largest), the switch device Stn into conduction. As to the r-phase which is one of the other phases, the switch signal generating unit 12 brings the switch device Srp into conduction in a period in which a value of the carrier is equal to or smaller than the reference through the comparison between the carrier and the reference (in this case, zero) (see period tr' in FIG. 6). As to the s-phase which is the other one of the other phases, the switch signal generating unit 12 brings the switch device Ssp into conduction in a period in which a value of the carrier is equal to or larger than the reference (see period ts' in FIG. 6). In this manner, the switch devices Srp and Ssp are switched at a timing at which the value of the carrier becomes the reference. Note that in the cases where the minimum value and the maximum value of the carrier are individually set to 0 and 1, for example, there may be employed a value obtained by subtracting the current conduction rate drt from the current command value in the comparison with the carrier.

In the waveform of the carrier, as described above, a slope is constant with respect to time and a linear portion thereof is internally divided at the current conduction rates drt and dst in accordance with the reference. Therefore, a ratio between the periods tr' and ts' is equal to a ratio between the current conduction rates drt and dst.

Note that a pair of the current command generating unit 11 and the switch signal generating unit 12 is considered to be a converter gate signal generating unit which performs commutation of the converter CNV1 at the timing at which the carrier takes the reference. In addition, the current command shows the same shape as that of the current conduction rate shown in FIG. 5, and accordingly is considered to determine the ratio between the current conduction rates drt and dst.

Through the switching operation as described above, the converter CNV1 converts the three-phase AC voltage input from the input terminals Pr, Ps and Pt into a DC voltage, and outputs this to the DC power supply lines LH and LL.

The switching operation as described above is desirably performed in the state in which zero voltage is achieved through switching of the inverter INV1. In other words, setting is desirably made such that the zero voltage period on the inverter INV1 side includes the timing of this switching (that is, timing at which the carrier takes the reference value). In FIG. 6, periods, in which the current does not flow through the DC power supply lines LH and LL due to the zero voltage in spite of the switch devices being brought into conduction, are shown by hatching. Conversely, the input currents ir, is and it do not flow in this period, and thus the switch devices Srp and Ssp are switched in this period for commutation.

Here, an average value of the current idc flowing in the period ts' in which the switch device Ssp is in conduction and an average value of the current idc flowing in the period tr' in which the switch device Srp is in conduction are made to be equal to each other, which suppresses distortion of an input current waveform. In other words, it is only required that the zero voltage period (see periods tr and ts in FIG. 6) in which the switch devices Sup, Svp and Swp are in nonconduction before and after switching between the switch devices Srp and Ssp be internally divided at the current conduction rates drt and dst of the switch devices Srp and Ssp, respectively. That is, establishment of the relationship tr'/ts'=tr/ts suppresses the distortion of the input current waveform. In order to establish the aforementioned relationship, the ratios therebetween are equally selected to drt/dst. That is, the relationship tr'/ts'=drt/dst is achieved by switching of the converter CNV1, and the relationship tr/ts=drt/dst is achieved by switching of the inverter INV1.

Next, description will be given of control on the inverter INV1 side so that the zero voltage period on the inverter INV1 side evenly acts on the respective input currents for establishing the aforementioned relationship. Also on the inverter INV1 side, conduction/nonconduction of the switch devices Sup, Svp, Swp, Sun, Svn and Swn is controlled so that the current conduction rates of the respective phases take, for example, a trapezoidal wave, thereby converting the DC voltage into a three-phase AC voltage. Then, the three-phase AC voltage is output to the output terminals Pu, Pv and Pw.

With reference to FIG. 4, the output voltage command generating unit 21 generates output voltage commands Vu*, Vv* and Vw* for a U-phase, a V-phase and a W-phase, respectively. Note that the output voltage commands Vu*, Vv* and Vw* are normalized to, for example, one. The first correcting unit 22 multiplies the respective output voltage commands generated by the output voltage command generating unit 21 by one (for example, dst) of the current conduction rates of the phase other than the phase in which the absolute value of the phase voltage is the largest, and adds the reference (in this case, zero) of the carrier to the value. The second correcting unit 23 multiplies the respective output voltage commands generated by the output voltage command generating unit 21 by the other one (for example, drt) of the current conduction rates of the phase other than the phase in which the absolute value of the phase voltage is the largest, and subtracts the value from the reference (in this case, zero) of the carrier. In FIG. 4, the current conduction rates are represented by dst and drt in blocks of the first correcting unit 22 and the second correcting unit 23, respectively, which is merely an example in a case where the phase in which the absolute value of the phase voltage is the largest is the t-phase. When the phase in which the absolute value of the phase voltage is the largest is the phase other than the t-phase, the current conduction rates employed in the first correcting unit 22 and the second correcting unit 23 differ as well.

The comparator 24 compares the output voltage command corrected by the first correcting unit 22 and the carrier. The comparator 25 compares the output voltage command corrected by the second correcting unit 23 and the carrier. The OR unit 26 obtains OR of the comparison results of the comparators 24 and 25, and outputs to the inverter INV1 as a switch signal.

With reference to FIG. 6, the U-phase will be described in detail as an example. The comparator 24 outputs, to the OR unit 26, a switch signal Sup1 for bringing the switch device Sup into conduction in a period in which a value of the carrier is equal to or larger than dst·Vu* through comparison between dst·Vu* from the first correcting unit 22 and the carrier. The comparator 25 outputs, to the OR unit 26, a switch signal Sup2 for bringing the switch device Sup into conduction in a period in which the value of the carrier is equal to or smaller than −drt·Vu* through comparison between −drt·Vu* and the carrier. The OR unit 26 takes OR of the switch signals Sup1 and Sup2, and outputs to the switch device Sup as a switch signal Sup. Through the aforementioned switching, the switch device Sup is brought into conduction in the period equal to or larger than dst·Vu* of the period ts', and in the period equal to or smaller than −drt·Vu* of the period tr'. Accordingly, the switch device Sup is brought into conduction, per cycle, in a period T0·{dst·(1−Vu*)+(−drt·Vu*−(−drt))}=(dst+drt)·(1−Vu*)·T0=(1−Vu*)·T0, where a cycle of the carrier is T0. This reveals that a conduction period of the switch device Sup in the case of being compared with the carrier without performing correction by the first correcting unit 22 and the second correcting unit 23 is also maintained in the case where correction is performed.

As to the V-phase and W-phase, switch signals Svp and Swp are output, respectively, through the processing similar to that of the U-phase. In this manner, the switch devices Sup and Svp of the inverter INV1 are switched at the timing at which the value of the carrier is equal to the value obtained by multiplying the command signals by the current conduction rates drt and −dst, respectively.

Note that a part composed of the output voltage command generating unit 21, the first correcting unit 22, the second correcting unit 23, the comparators 24 and 25, and the OR unit 26 is considered to be an inverter gate signal generating unit, where a value for internally dividing a value from the reference to the maximum value of the carrier at a ratio between the third value (1−Vu* in the example above) and the fourth value (Vu* in the same way) is a first command value (dst·Vu* in the same way) and a value for internally dividing a value from the minimum value of the carrier to the reference at a ratio between the third value and the fourth value is a second command value (−drt·Vu*), allowing adoption of a zero voltage vector as a switching mode of the inverter in a period in which the carrier takes the first command value to the second command value.

Through the aforementioned switching control on the inverter INV1 side, voltage vectors V0, V4, V6, V4, V0, . . . appear repeatedly in one carrier cycle shown in FIG. 6. In the period in which the voltage vector V0 is produced, the output terminals Pu, Pv and Pw are short-circuited with each other by the DC power supply line LL, whereby zero voltage is generated between ones of the output terminals Pu, Pv and Pw.

Then, through the switching control on the converter CNV1 side, the switch devices Srp and Ssp are switched during the zero voltage period of the inverter, with the result that commutation on the converter CNV1 side is performed in the state where the input currents ir, is and it and the current idc do not flow.

As a result of the switching as described above in the converter CNV1, a ratio between the period ts in which the voltage vector V0 is produced during the period ts' when the switch device Ssp is in conduction and the period tr in which the voltage vector V0 is produced during the period tr' when the switch device Srp is in conduction is equal to the ratio between the current conduction rates dst and drt. Accordingly, the ratio between the period ts' and the period ts in which the input current is does not flow despite the switch device Ssp being in conduction is equal to the ratio between the period tr' and the period tr in which the input current it does not flow despite the switch device Srp being in conduction. That is, the zero voltage periods (see tr and ts in FIG. 6) before and after switching between the switch devices Srp and Ssp are proportional to the current conduction rates drt and dst of the switch devices Srp and Ssp, respectively.

Therefore, the zero voltage period on the inverter INV1 side evenly acts on the input currents of the converter CNV1, whereby it is possible to suppress distortion of the input current waveform.

Further, according to the power converting apparatus of the first embodiment, it is only required that a position serving as a reference of the carrier is adjusted without changing a form thereof, and thus the carrier is generated with ease, which enables the carrier generating unit 32 with a simple configuration. Moreover, the common carrier is used in the converter CNV1 and the inverter INV1, whereby the converter CNV1 and the inverter INV1 are easily synchronized with each other.

Note that though the description has been given assuming that the absolute value of the slope of the carrier is constant, which is not necessarily limited thereto. For example, the absolute value of the slope is only required to be constant during the carrier cycle taken by the peak-to-peak of the carrier, and slopes may differ in different carrier cycles. The same holds true for other modes described in the following description.

In addition, a triangular-wave-shape carrier suitable for PWM modulation is used, and thus a circuit (for example, carrier generating unit 32 and the like) for pulse width modulation may be simplified.

Figure 7:
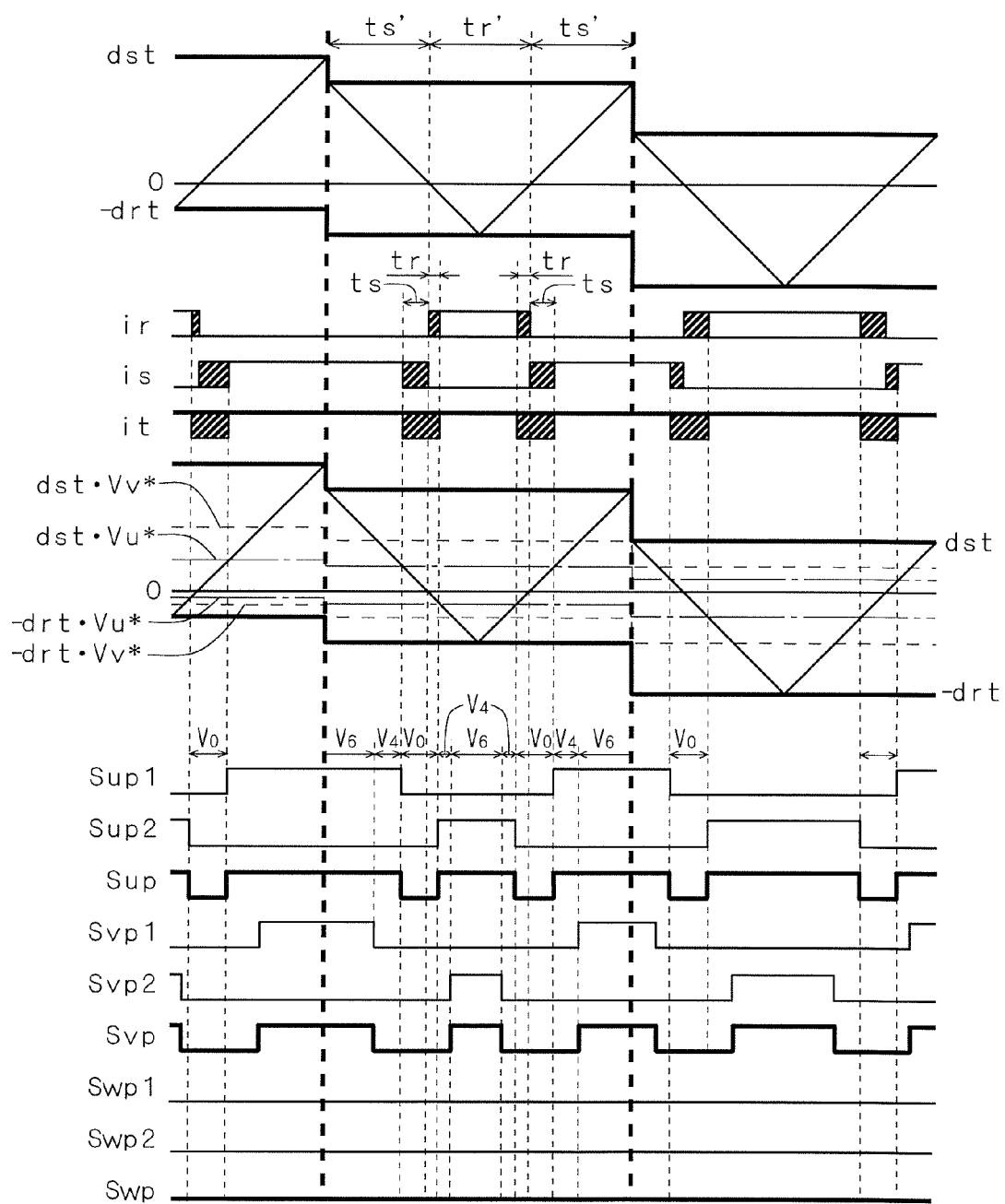

Next, in order to further deepen understanding of the power converting apparatus according to the first embodiment, FIG. 7 shows a waveform of a carrier for approximately two cycles. Note that contrary to FIG. 6, a point being a peak of the carrier is assumed to be a starting point of one cycle of the carrier. Although FIG. 6 shows the current conduction rate without being changed in different cycles, in actuality, the current conduction rate changes for every carrier cycle. For this reason, in FIG. 7, the position on which a carrier is based differs for every carrier cycle. The other is the same as the contents described with reference to FIG. 6, and thus detailed description will be omitted.

Next, with reference to FIG. 5, function forms of the current conduction rates expressed by Equation (1) will be described. As to the current conduction rates, an absolute value of a waveform in a slope area is expressed in common to the slope areas of the respective phases if a phase angle ø ($0 \leq ø \leq \pi/3$: ø is a phase in an area obtained by equally dividing one cycle of a command signal phase θ into six) is individually introduced to each of the areas 1 and 2 from the symmetry of the phase voltages Vr, Vs and Vt. Here, the waveform of the slope area is introduced with the area 1 of $30° \leq θ \leq 90°$ being under examination. The relationship ø=θ−π/6 is established in this area, and thus in the slope area in which the current conduction rate increases along with an increase in phase angle ø, the current conduction rate thereof is expressed by sin ø/sin(ø+π/3). This is expressed as $(1+\sqrt{3} \tan(ø-\pi/6))/2$ using addition theorem of trigonometric function. In a similar manner, in the slope area in which the current conduction rate decreases along with an increase in phase angle ø, the current conduction rate thereof is expressed by $(1-\sqrt{3} \tan(ø-\pi/6))/2$. Therefore, the current command has a trapezoidal wave which has a flat section of 60 degrees, and includes two types of absolute values in the slope area, $(1+\sqrt{3} \tan(ø-\pi/6))/2$ and $(1-\sqrt{3} \tan(ø-\pi/6))/2$.

Figure 8:
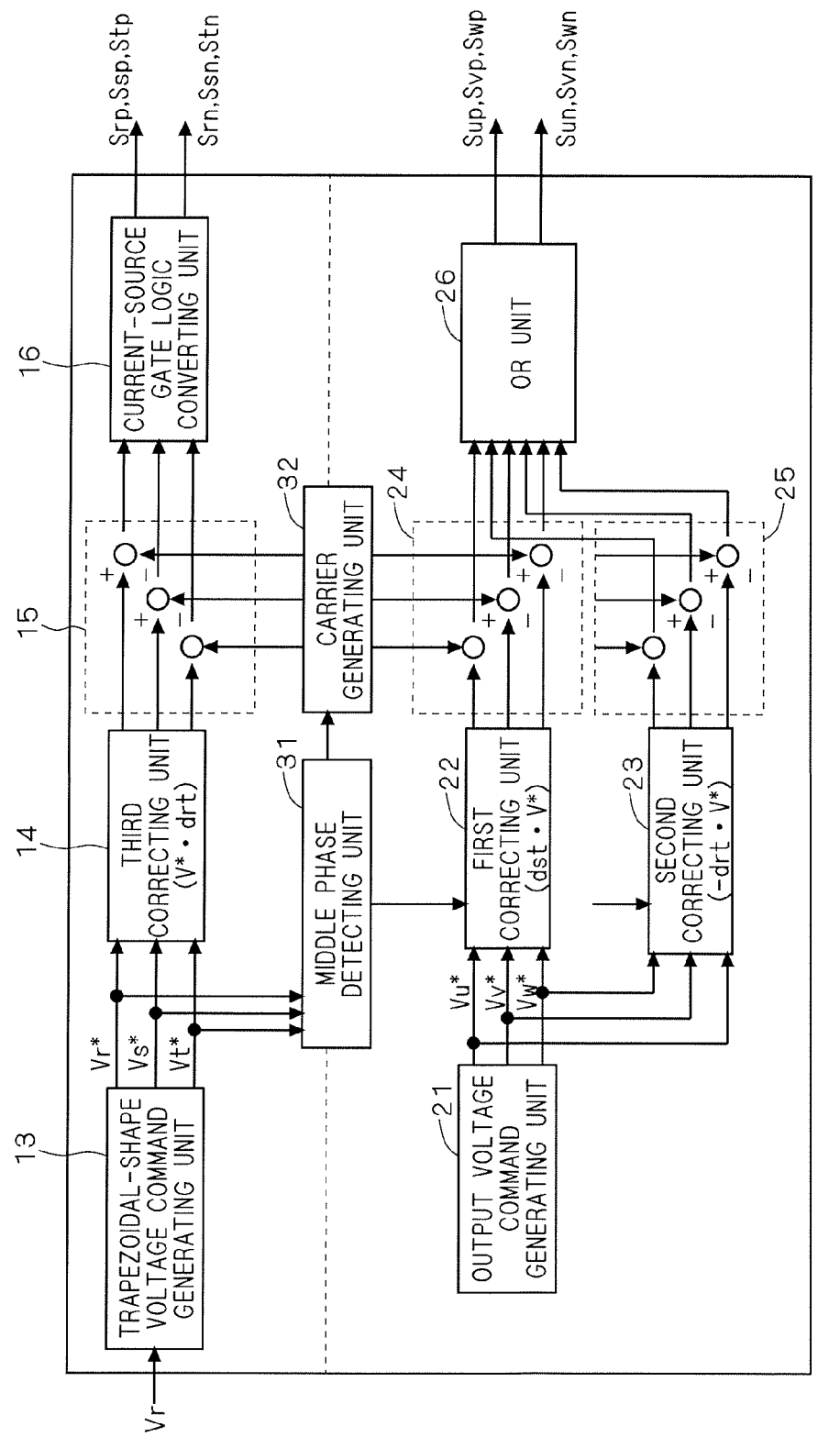
FIG. 8 is a configuration diagram showing another conceptual example of the control unit.

Note that the converter CNV1 is controlled based on a current command in the example described above, which is not limited thereto, and the converter CNV1 may be controlled based on a voltage command. FIG. 8 is a configuration example showing other conceptual example of the control unit 1 according to the first embodiment.

Contrary to FIG. 4, the control unit 1 includes a trapezoidal-shape voltage command generating unit 13, a third correcting unit 14, a comparator 15 and a current-source gate logic computing unit 16 in place of the current command generating unit 11 and the switch signal generating unit 12, and includes a middle phase detecting unit 31 in place of the two phase command detecting unit 31.

The trapezoidal-shape voltage command generating unit 13 receives a power supply synchronization signal Vr, and generates trapezoidal-wave-shape voltage commands Vr*, Vs* and Vt* for the r-phase, s-phase and t-phase based on the power supply synchronization signal Vr. FIG. 9 shows the phase voltages Vr, Vs and Vt and the voltage commands Vr*, Vs* and Vt*. Note that the voltage commands Vr*, Vs* and Vt* are shifted by 30 degrees with respect to the three-phase AC voltage to be input. The reason for this will be described below.

For example, a range where a phase angle is 30 degrees to 90 degrees is described, and then the voltage command Vr* for the r-phase which is the maximum phase is 1, the voltage command Vs* for the s-phase which is the middle phase is $\sqrt{3} \tan(\o-\pi/6)$, and the voltage command Vt* for the t-phase which is the minimum phase is $-1$, where ø represents a phase in the area obtained by equally dividing one cycle of the command signal phase θ into six. That is, as to ø, a start of the area is indicated by 0, and an end of the area is indicated by $\pi/3$. Here, $\pi/6 \leq \theta \leq \pi/2$ and $\o = \theta - \pi/6$. The reason why the voltage command desirably takes the waveform as described above will also be described below.

Those voltage commands are obtained by normalizing values, which are individually expressed by the voltage between the DC power supply lines LH and LL with respect to a resultant obtained by adding a half of the middle phase to each of the three-phase AC voltage commands of a sine wave, by one, and performing translating thereon by the phase angle of 30 degrees.

More specific description will be given. Voltage commands Vr*', Vs*' and Vt*' of the sine wave are expressed by the following equations.

$$Vr^{*\prime}=V\cdot\cos\theta, Vs^{*\prime}=V\cdot\cos(\theta-2\pi/3), Vt^{*\prime}=V\cdot\cos(\theta+2\pi/3) \quad (6)$$

For example, when the phase angle is 0 degrees to 60 degrees, the middle phase is the r-phase, and thus the following equations are derived if a half of the voltage command Vs*' of the middle phase is added to the voltage commands Vr*', Vs*' and Vt*'.

$$Vr^{*\prime}=\sqrt{3}/2\cdot V\cdot\sin(\theta+\pi/3),$$

$$Vs^{*\prime}=3/2\cdot V\cdot\sin(\theta-\pi/6),$$

$$Vt^{*\prime}=\sqrt{3}/2\cdot V\cdot\sin(\theta+\pi/3) \quad (7)$$

FIG. 10 shows the voltage commands Vr*', Vs*' and Vt*'.

An envelope (hereinafter, referred to as pulsating voltage Vlink) on a high-potential side of a voltage between the DC power supply lines LH and LL is a voltage difference between the maximum phase and the minimum phase, which is the line voltage Vrt when the phase angle is 0 degrees to 60 degrees. Thus, the pulsating voltage Vlink is expressed by the following equation.

$$V\text{link}=Vrt=Vt-Vr=\sqrt{3}\sin(\theta+\pi/3) \quad (8)$$

Thus, the following equation is derived when Equation (8) is substituted into Equation (7).

$$Vr^{*\prime}=V\text{link}/2,$$

$$Vs^{*\prime}=\sqrt{3}/2\cdot V\text{link}\cdot\cos(\theta-2\pi/3)/\sin(\theta+\pi/3) = \sqrt{3}/2\cdot V\text{link}\cdot\tan(\theta-\pi/6)$$

$$Vt^{*\prime}=-V\text{link}/2 \quad (9)$$

Then, the voltage commands are normalized by the r-phase voltage command Vr*, and this arithmetic operation is performed on the other phase angle as well. As described below, in consideration of the fact that a voltage-source switch signal is generated from the voltage command to be converted into a current-source switch signal, the voltage command after arithmetic operation is translated by 30 degrees in a direction in which the phase angle increases for eliminating a phase difference between a voltage-source and a current-source. In this manner, the voltage commands Vr*, Vs* and Vt* shown in FIG. 9 are generated. In FIG. 9, an amplitude is expressed by 1(Vlink=1). The slope area of the voltage command is expressed by $\sqrt{3}\tan(\o-\pi/6)(\pi/6\leq\theta\leq\pi/2)$ and $-\sqrt{3}\tan(\o-\pi/6)(7\pi/6\leq\theta\leq 3\pi/2)$, where ø represents a phase in the area obtained by equally dividing one cycle of the command signal phase θ into six). Further, a slope area of a voltage command in a predetermined phase is also expressed by $\sqrt{3}\cdot\tan(\theta-5\pi/3)(3\pi/2+2\pi\cdot N\leq\theta\leq 11\pi/6+2\pi\cdot N$, where N is an integer), and $-\sqrt{3}\cdot\tan(\theta-2\pi/3)(\pi/2+2\pi\cdot N\leq\theta\leq 5\pi/6+2\pi\cdot N$, where N is an integer).

The middle phase detecting unit 31 receives those voltage commands Vr*, Vs* and Vt*, and detects a middle phase based on the voltage commands Vr*, Vs* and Vt*, to thereby output a current conduction rate (for example, drt) thereof to the carrier generating unit 32.

The third correcting unit 14 normalizes the voltage commands Vr*, Vs* and Vt* by an amplitude of the carrier, and subtracts (offsets), for example, the current conduction rate drt therefrom to output to the comparator 15. The comparator 15 compares the carrier from the carrier generating unit 32 and the voltage command from the third correcting unit 14, and outputs the result thereof to the current-source gate logic computing unit 16 as a switch signal for a voltage-source converter. Then, the current-source gate logic computing unit 16 converts the switch signal for a voltage-source converter into a switch signal for a current-source converter from duality of a voltage-source and a current-source, to thereby output this to the converter CNV1.

The reason why the waveforms of the voltage commands Vr*, Vs* and Vt* are adopted as described above is now described. The phase voltage corresponds to a phase current in terms of the duality of the voltage-source and the current-source, and thus the switch signal for a voltage-source converter defines a phase current flowing through the converter. On the other hand, the phase current and the line current have a relationship of, for example, ir=irt−isr (where irt and isr represent phase currents). Therefore, switching of the current-source converter for allowing the line current ir to flow corresponds to switching of the voltage-source converter for allowing the phase currents irt and isr, by which the line voltage is expressed by the equation above, to flow. That is, the condition under which a pair of the switch signals for a voltage-source converter for allowing the phase currents irt and isr to flow is turned on at the same time is the switch signal of the line current ir (for example, see Takaharu Takeshita, Koji Toyama, Nobuyuki Matsui, "PWM scheme for current source three-phase inverters and converters").

Accordingly, the current-source gate logic computing unit 16 converts a voltage-source switch signal into a current-source switch signal using operational equations below.

$$Srp=Srt\cdot Ssr', Srn=Srt'\cdot Ssr$$

$$Ssp=Ssr\cdot Sts', Ssn=Ssr\cdot Sts$$

$$Stp=Sts\cdot Srt', Stn=Sts'\cdot Srt \quad (10)$$

In this case, switch signals Srt, Ssr and Sts and switch signals Srt', Ssr' and Sts' which are inversion signals thereto, respectively, are switch signals regarding the phase currents, that is, the voltage-source switch signals (comparison results of the comparator 15). For example, in order to output a positive current as the line current ir, the switch signal Srp corresponds to switching for connecting the DC power supply line HL and the input terminal Pr to each other. In addition, flowing of the line current ir as described above corresponds to flowing of the phase currents irt and isr. When its positive and negative polarities are caused to coincide with those of the line current ir, the switching signal Srt corresponds to allowing the phase current irt to flow in a positive direction and the switching signal Ssr' corresponds to allowing the phase current isr to flow in a negative direction.

The line voltage in the voltage-source corresponds to the line current in the current-source from duality. Therefore, the waveform of the voltage command is only required to be set such that a waveform of the line voltage of the voltage command (hereinafter, "line voltage command") becomes the waveform of the current command. The fact that the line voltage of the voltage command (line voltage command) which is derived based on Equation (9) takes the waveform of the current command is now described below.

FIG. 11 shows line voltage commands Vrs*, Vst* and Vtr* calculated with the voltage commands Vr*, Vs* and Vt*. The line voltage commands Vrs* and Vst* are expressed by the equation below within a range where the phase angle θ is, for example, 30 degrees to 90 degrees:

$$Vrs^* = Vr^* - Vs^* = 1 - \sqrt{3}\tan(ø - \pi/6); \text{ and}$$

$$Vst^* = Vs^* - Vt^* = 1 + \sqrt{3}\tan(ø - \pi/6) \quad (11)$$

where ø represents a phase in an area obtained by equally dividing one cycle of the command signal phase θ into six. In this case, $\pi/6 \leq \theta \leq \pi/2$ and $ø = \theta - \pi/6$. In this manner, the line voltage commands coincide with the line current commands Ir*, Is* and It* (see FIG. 5) except for amplitude thereof, which contribute to switching of the current-source converter when the voltage commands Vr*, Vs* and Vt* are normalized by the amplitude of the carrier.

Accordingly, the input current may have a sine wave shape in a similar manner to the mode using a current command. In addition, the waveform in this configuration is the same as that of FIG. 6, with the result that the zero voltage vector generated by the inverter INV1 is allowed to evenly act on the input currents ir, is and it, which suppresses distortion of a waveform of an input current which results from the zero voltage vector.

Note that the line voltage commands coincide with the line current commands Ir*, Is* and It* except for the amplitude thereof as described above, and thus a phase difference among the voltage commands Vr, Vs and Vt is considered to determine a ratio between the current conduction rates drt and dst.

In addition, as the PWM modulation scheme, it is applicable to a power converting apparatus of a space vector modulation scheme using a voltage vector, in addition to the scheme of a triangular-wave-shape carrier signal.

An upper side of FIG. 12 is a vector diagram showing space vectors in PWM modulation of a space vector modulation scheme, and a diagram for describing voltage vectors of FIG. 9, which corresponds to the voltage commands before performing translating of 30 degrees in FIG. 9. As shown in this vector diagram of the voltage command, in the voltage vectors, six states (V1 to V6) among eight states are vectors which are not zero, and other two states (V0, V7) are in a zero state.

In this space vector modulation scheme, if τ0, τ4 and τ6 represent output time of the voltage vector when a phase angle ø is 0 to π/3, T0 represents a cycle of a carrier, and ks represents a voltage control factor, a basic equation of the voltage vector is expressed by the following equations.

$$\tau 0/T0 = 1 - ks \cdot \sin(ø + \pi/3)$$

$$\tau 4/T0 = ks \cdot \sin(\pi/3 - ø)$$

$$\tau 6/T0 = ks \cdot \sin ø \quad (12)$$

The voltage command signals Vr*, Vs* and Vt* in those phase angle 0 to π/3 are expressed by the following equations.

$$Vr^* = 1 - 2(\tau 0/2T0) = ks \cdot \sin(ø + \pi/3)$$

$$Vs^* = ks \cdot \sin(ø + \pi/3) - 2(\tau 4/2T0) = \sqrt{3}ks \cdot \sin(ø - \pi/6)$$

$$Vt^* = -1 + 2(\tau 0/2T0) = -ks \cdot \sin(ø + \pi/3) \quad (13)$$

A lower side of FIG. 12 shows voltage vectors corresponding to line voltage control waveforms of FIG. 10 with phase angle of 0 to π/3. Note that the voltage control factor ks is 0.5 in FIG. 12. Here, when the phase angle ø is 0 to π/3, a middle phase voltage Vs*_mid between the voltage command signals Vs* and Vt* is expressed by the following equation.

$$Vs^*\_mid = Vs^*/Vr^* = \sqrt{3}ks \cdot \sin(ø - \pi/6)/(ks \cdot \sin(ø + \pi/3)) = \sqrt{3}\tan(ø - \pi/6) \quad (14)$$

FIG. 13 shows voltage vectors corresponding to trapezoidal wave modulation waveforms (phase voltages) of FIG. 9 with phase angle of 0 to π/3 (note that FIG. 13 is a figure before translating by 30 degrees). τ4/T0 and τ6/T0 of the basic equation of the space vector modulation scheme are expressed by the following equations.

$$\tau 4/T0 = (1 - Vr^*)/2 = (1 - \sqrt{3}\tan(ø - \pi/6))/2$$

$$\tau 6/T0 = 1 - \tau 6/T0 = (1 + \sqrt{3}\tan(ø - \pi/6))/2 \quad (15)$$

This basic equation is read for every π/3 phase angle in the table of FIG. 12, and output time of the voltage vector is determined, which enables PWM waveform generation.

Note that the line voltage command signal Vst* is expressed by the following equation as shown in FIG. 14.

$$Vst^* = \sqrt{3}\sin(ø - \pi/6)/\sin(ø + \pi/3) + 1 = 1 + \sqrt{3}\tan(ø - \pi/6) \quad (16)$$

First Modification

Although a triangular-wave-shape carrier is used in the first embodiment, the carrier generating unit 32 generates a sawtooth-wave-shape carrier in the first modification. FIG. 15 shows a relationship among the carrier generated by the carrier generating unit 32, the input currents ir, is and it flowing through the r-phase, s-phase and t-phase, respectively, the current idc flowing through the DC power supply lines LH and LL, and switch signals supplied to the inverter INV1. FIG. 15 shows a carrier of approximately one cycle within a range of 30 degrees to 90 degrees in FIG. 5.

The carrier generating unit 32 generates a carrier having a sawtooth-wave-shape waveform, based on a position at which an amplitude (in this case, normalized to 1) of the waveform is internally divided into the current conduction rates drt and dst. Note that a sum of the current conduction rate drt and the current conduction dst is one, and thus the carrier based on the minimum value may be offset in a negative direction, for example, in the amplitude direction by the amount of the current conduction rate drt.

As in the first embodiment, the control unit 1 outputs switch signals to the switch devices of the converter CNV1 and the inverter INV1. Note that the sawtooth-wave-shape carrier is used, and thus not only the voltage vector V0 but also the voltage vector V7 is used on the inverter INV1 side. Also in the voltage vector V7, the output terminals Pu, Pv and Pw are short-circuited with each other by the DC power supply line LL to generate zero voltage, with the result that the currents idc, ir, is and it chip during this period.

Also in this case, a ratio between the period ts when the voltage vectors V0 and V7 are generated in the period ts' in which the switch device Ssp is in conduction and the period tr when the voltage vectors V0 and V7 are generated in the period tr' when the switch device Srp is in conduction is equal to the ratio between the current conduction rates dst and drt. Accordingly, a ratio between the period ts' and the period ts when the input current chips is equal to a ratio between the period tr' and the period tr when the input current ir chips. That is, the zero voltage periods (see periods tr and ts in FIG. 15) before and after switching between the switch devices Srp and Ssp are proportional to the current conduction rates drt and dst of the switch devices Srp and Ssp, respectively.

Therefore, it is possible to suppress distortion of the input current waveform. In addition, only required is to adjust a reference without changing a shape of a carrier, which makes it possible to generate a carrier with ease. Moreover, it is possible to use a common carrier between the converter CNV1 and the inverter INV1.

Further, a sawtooth-wave-shape carrier is used, which enables a configuration capable of simplifying carrier generation and modulation processing and more suitable for being designed into software. However, the voltage vectors V0 and V7 need to be used as the zero voltage vector, which is disadvantageous in terms of loss from two-phase modulation to three-phase modulation on the inverter INV1 side. Moreover, as generally known, the sawtooth wave is inferior to a triangular wave 2f as to a main component of a voltage spectrum by a carrier, in terms off and noise.

Note that a sawtooth-wave-shape carrier may be used in a similar manner even in the mode based on the voltage-source command (see FIG. 8).

Second Modification

The common carrier is used in the converter CNV1 and the inverter INV1 in the first embodiment and the first modification, which is not necessarily limited thereto.

FIG. 16 shows a relationship among the carrier generated by the carrier generating unit 32, the input currents ir, is and it flowing through the r-phase, s-phase and t-phase, respectively, the current idc flowing through the DC power supply lines LH and LL, and switch signals supplied to the inverter INV1.

The carrier generating unit 32 generates a first carrier having a waveform in which a slope is constant to time, based on a minimum value of a waveform value and generates a second carrier, based on a position at which an amplitude of the waveform is internally divided into the current conduction rates. Note that the generated first carrier may be offset to generate the second carrier.

The switch signal generating unit 12 outputs a switch signal on the converter side through comparison between the first carrier and the current conduction rate. For example, the switch signal generating unit 12 always brings the switch device Stn into conduction as to the minimum phase, t-phase, in which an absolute value of a phase voltage becomes the largest (see the input current it in FIG. 16). As to the r-phase which is one of the other phases, the switch signal generating unit 12 brings the switch device Srp into conduction in a period in which a value of the carrier is equal to or smaller than the current conduction rate drt through comparison between the carrier and the current conduction rate drt (see the input current ir in FIG. 16). As to the s-phase which is the other one of the other phases, the switch signal generating unit 12 brings the switch device Ssp into conduction in a period in which a value of the carrier is equal to or larger than the current conduction rate drt (see the input current is in FIG. 16).

Even in this case, the same input currents as the input currents ir, is and it shown in FIG. 6 flow, whereby the same effects as those in the first embodiment are achieved.

Note that though the first carrier is used on the converter CNV1 side, the first carrier may be used on the inverter INV1 side. In this case, the current conduction rate (for example, drt) may be added (offset) to the respective output results of the first correcting unit 22 and the second correcting unit 23.

Note that even in the mode based on the voltage-source command (see FIG. 8), the comparator 15 may compare the first carrier and the voltage-source command on the converter CNV1 side, except for the third correcting unit 14. Alternatively, the first carrier may be used on the inverter INV1 side. In this case, the current conduction rate (for example, drt) may be added (offset) to the respective output results of the first correcting unit 22 and the second correcting unit 23.

Second Embodiment

Figure 17:
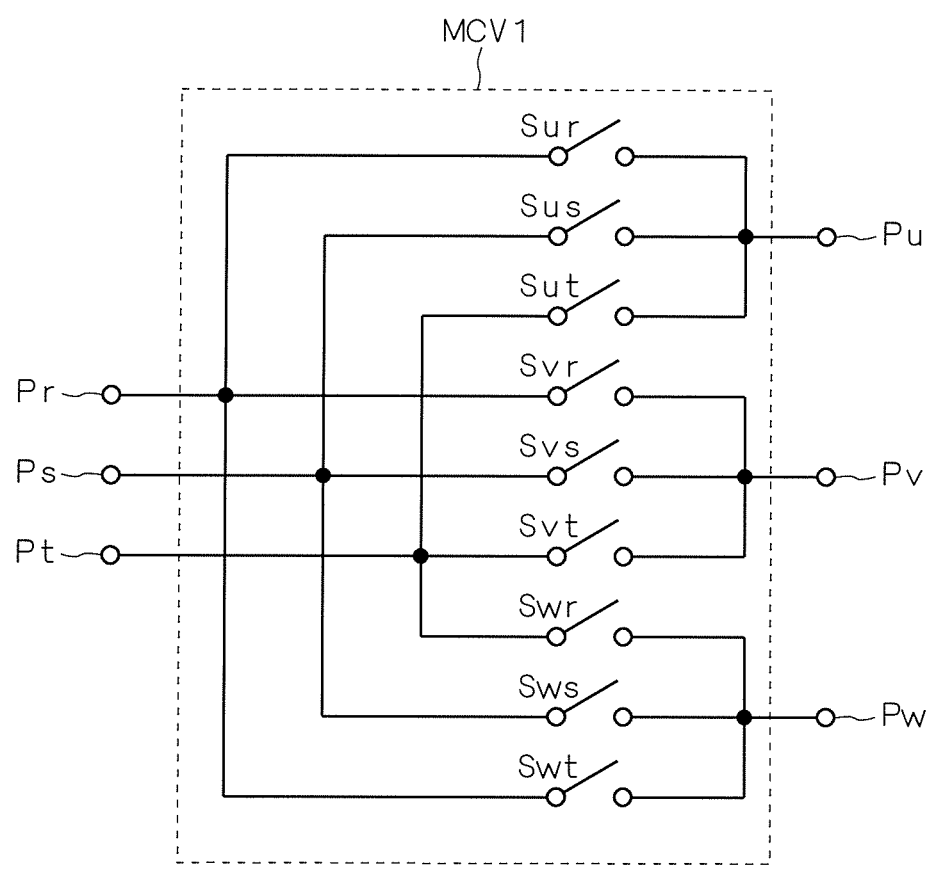
FIG. 17 is a configuration diagram showing a conceptual example of a power converting apparatus according to a second embodiment.

FIG. 17 is a configuration diagram showing a conceptual example of a power converting apparatus according to a second embodiment. This power converting apparatus includes the input terminals Pr, Ps and Pt, a direct converting unit MCV1, and output terminals Pu, Pv and Pw.

The direct converting unit MCV1 includes switch devices Sur, Sus, Sut, Svr, Svs, Svt, Swr, Sws and Swt. Three switch devices Sur, Sus and Sut are connected between each of the input terminals Pr, Ps and Pt and the output terminal Pu. Three switch devices Svr, Svs and Svt are connected between each of the input terminals Pr, Ps and Pt and the output terminal Pv. Three switch devices Swr, Sws and Swt are connected between each of the input terminals Pr, Ps and Pt and the output terminal Pw.

Those switch devices are controlled by a control unit 10 described below such that at least any of an amplitude and a cycle of a three-phase AC input voltage input from the input terminals Pr, Ps and Pt is converted to output to the output terminals Pu, Pv and Pw as a three-phase AC output voltage.

Figure 18:
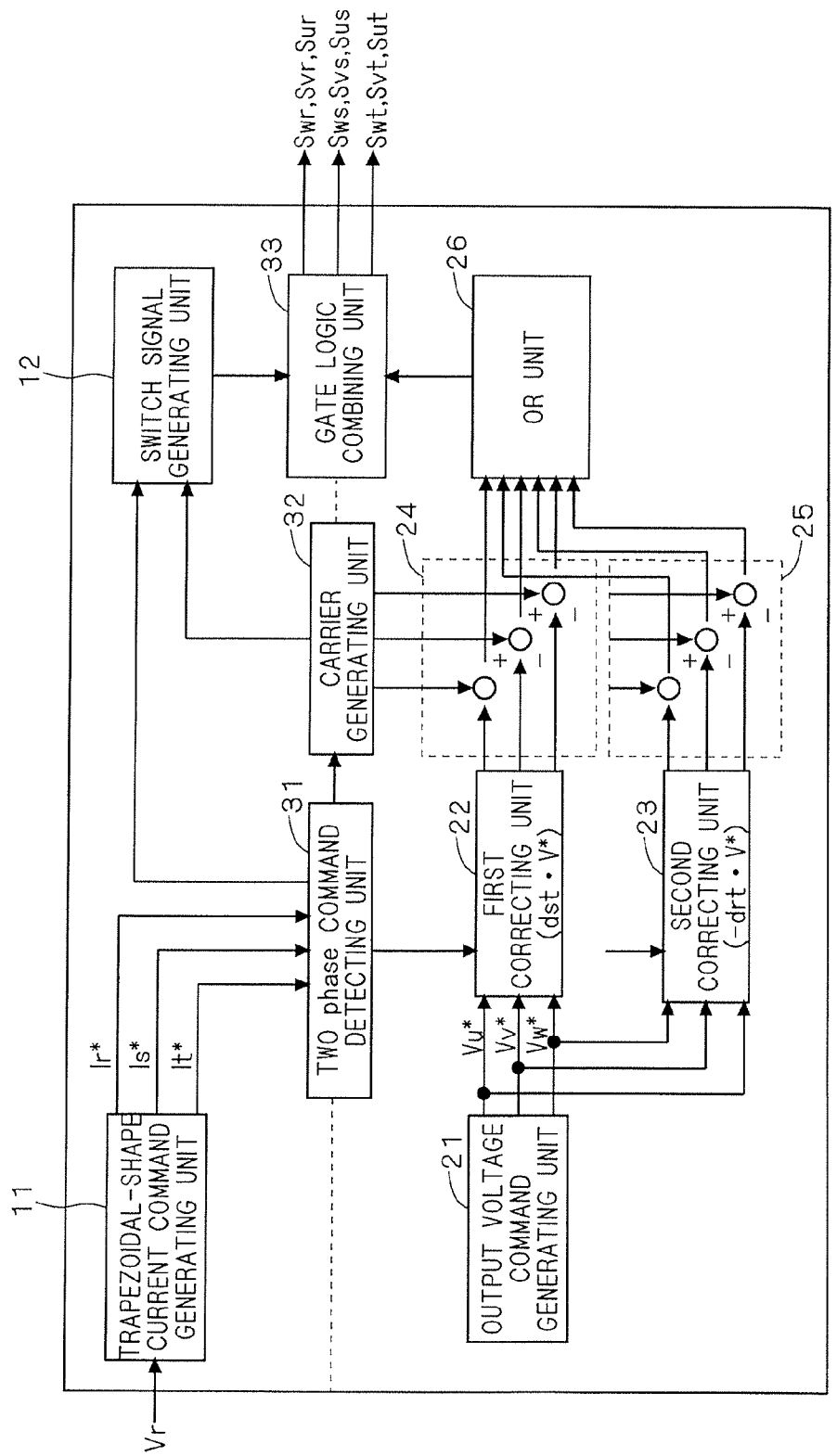
FIG. 18 is a configuration diagram showing a conceptual example of a control unit according to the second embodiment.

FIG. 18 is a configuration diagram showing a conceptual example of the control unit 10. Contrary to the control unit 1 shown in FIG. 4, the control unit 10 further includes a gate logic combining unit 33. The current command generating unit 11, the switch signal generating unit 12, the two phase command detecting unit 31, the carrier generating unit 32, the output voltage command generating unit 21, the first correcting unit 22, the second correcting unit 23, the comparators 24 and 25, and the OR unit 26 are the same as those of the first embodiment (including the first and second modifications).

As to the control of the direct converting unit MCV1, a virtual converter CNV1 and a virtual inverter INV1 having similar configurations to those of the converter CNV1 and the inverter INV1 shown in FIG. 1 are assumed in the direct converting unit MCV1, and switch signals to those virtual converter CNV1 and virtual inverter INV1 are combined by the gate logic combining unit 33, to thereby control the direct converting unit MCV1.

More specifically, the gate logic combining unit 33 performs matrix transform on a switch signal from the switch signal generating unit 12 and a switch signal from the OR unit 26 from the following expression, and outputs as switch signals of the direct converting unit MCV1.

Expression 1 (17)

$$\begin{pmatrix} Sut & Svt & Swt \\ Sus & Svs & Sws \\ Sur & Svr & Swr \end{pmatrix} = \begin{pmatrix} Sup & Sun \\ Svp & Svn \\ Swp & Swn \end{pmatrix} \begin{pmatrix} Srp & Ssp & Stp \\ Srn & Ssn & Stn \end{pmatrix}$$

In this case, for example, virtual switch devices Srp and Ssp connected to two input terminals are switched with the first value (for example, current conduction rate drt) and the second value (for example, current conduction rate dst) being current conduction rates (duties) thereof, respectively. In addition, the carrier takes a position at which an amplitude thereof is internally divided by the first value and the second value as a reference, to thereby switch between, for example, the virtual switch devices Sup and Svp of the virtual inverter INV1 at a timing at which a value obtained by respectively multiplying virtual output voltage commands Vu*, Vv* and Vw* by a value obtained by multiplying the first value and the second value. On the other hand, for example, the virtual switch devices Srp and Ssp of the virtual converter CNV1 are switched at a timing at which the waveform of the carrier becomes the reference. Accordingly, the virtual switches Sup, Svp and Swp of the virtual inverter INV1 are brought into nonconduction at the timing at which the virtual switch devices Srp and Ssp of the virtual converter CNV1 are switched, whereby it is possible to perform commutation on the virtual converter CNV1 side in the state in which current does not flow through the DC power supply lines LH and LL.

Moreover, before and after the switching between the virtual switch devices Srp and Ssp, the period (zero voltage period) in which the virtual switch devices Sup, Svp and Swp of the virtual inverter INV1 are brought into nonconduction is proportional to the current conduction rates of the virtual switch devices Srp and Ssp of the virtual converter CNV1.

Accordingly, in a case where commutation of the virtual converter CNV1 is performed without causing the input current to flow through the virtual inverter INV1, the zero voltage period in the virtual converter CNV1 evenly acts on three input terminals. Therefore, it is possible to suppress distortion of the current at the input terminals Pr, Ps and Pt, which results from the zero voltage generated at three output terminals.

The switch signal is output to the direct converting unit MCV1 based on the switch signal on the virtual inverter INV1 and the switch signal on the virtual converter CNV1, which suppresses distortion of the current at the input terminals Pr, Ps and Pt, which results from the zero voltage generated at three output terminals Pu, Pv and Pw in this power converting apparatus.

Note that the control unit 10 may be configured such that the gate logic combining unit 33 is provided between the current-source gate logic combining unit 16 and the OR unit 26 in the control unit 1 shown in FIG. 8.

While the invention has been shown and described in detail, the foregoing description is in all aspects illustrative and not restrictive. It is therefore understood that numerous modifications and variations can be devised without departing from the scope of the invention.

The invention claimed is:

1. A power converting apparatus, comprising:
three input terminals configured to respectively receive a phase voltage of three-phase AC;
three output terminals;
first and second DC power supply lines;
a converter including a first switch device group including
a first set of three switch devices connected between said first DC power supply line and said input terminals, and
a second set of three switch devices connected between said second DC power supply line and said input terminals,
an inverter including a second switch device group including
a first set of three switch devices connected between said first DC power supply line and said output terminals, and
a second set of three switch devices connected between said second DC power supply line and said output terminals,
a carrier generating unit configured to generate a carrier having a waveform in which an absolute value of a slope is constant with respect to time, with a reference internally dividing an amplitude of said waveform into a first value and a second value, said first and second values being current conduction rates;
a converter gate signal generating unit configured to perform commutation of said converter at a timing at which said carrier takes said reference; and
an inverter gate signal generating unit configured to allow adoption of a zero voltage vector as a switching mode of said inverter in a period in which said carrier changes a first command value to a second command value,
said first command value internally dividing a region from said reference to a maximum value of said carrier at a ratio between a third value and a fourth value, and
said second command value internally dividing a region from a minimum value of said carrier to said reference at a ratio between said third value and said fourth value,
said third value being an output voltage command, and said fourth value being obtained by subtracting said voltage command from said amplitude of said carrier.

2. The power converting apparatus according to claim 1, wherein
said converter gate signal generating unit is further configured to compare said carrier and a current command having a trapezoidal wave shape to determine a ratio between said first value and said second value in order to perform commutation of said converter; and
a slope area of said current command is expressed by $|ds^*|=(1+\sqrt{3}\tan(ø-\pi/6))/2$; and $|dt^*|=(1-\sqrt{3}\tan(ø-\pi/6))/2$, where ds* and dt* represent a line current conduction rate, a phase angle ø is $0 \le ø \le \pi/3$, and ø represents a phase in an area obtained by equally dividing one cycle of a command signal phase θ into six.

3. The power converting apparatus according to claim 1, wherein
said converter gate signal generating unit is further configured to convert a voltage-source switch signal obtained by comparing said carrier and a voltage command having a trapezoidal wave shape to determine a ratio between said first value and said second value into a current-source switch signal and to supply said current-source switch signal to said converter, to thereby perform commutation of said converter; and
a slope area of said voltage command is expressed by
$\sqrt{3}\tan(ø-\pi/6)$, where a phase angle ø is $\pi/6 \le θ \le \pi/2$; and
$-\sqrt{3}\tan(ø-\pi/6)$, where a phase angle ø is $7\pi/6 \le θ \le 3\pi/2$,
and ø represents a phase in an area obtained by equally dividing one cycle of a command signal phase θ into six.

4. A power converting apparatus, comprising:
three input terminals respectively receiving phase voltages;

three output terminals;
a direct converter including
  a first set of three switch devices provided between a first one of said output terminals and said three input terminals,
  a second set of three switch devices provided between a second one of said output terminals and said three input terminals, and
  a third set of three switch devices provided between a third one of said output terminals and said three input terminals;
a carrier generating unit generating a carrier having a waveform in which an absolute value of a slope is constant with respect to time, with a reference internally dividing an amplitude of said waveform into a first value and a second value, said first and second values being current conduction rates; and
a control unit configured to output a third switch signal to said first, second and third sets of switch devices, said third switch signal being computed by performing matrix transform on a first switch signal and a second switch signal, said control unit being configured with first and second virtual DC power supply lines, a virtual converter and a virtual inverter,
  the virtual converter including
    a first set of three virtual switch devices connected between said first virtual DC power supply line and said input terminals, and
    a second set of three virtual switch devices connected between said second virtual DC power supply line and said input terminals,
  the virtual inverter including
    a first set of three virtual switch devices connected between said first virtual DC power supply line and said output terminals, and
    a second set of three virtual switch devices connected between said second DC power supply line and said output terminals,
said first switch signal performing commutation of said virtual converter at a timing at which said carrier takes said reference; and
said second switch signal allowing adoption of a zero voltage vector as a switching mode of said virtual inverter in a period in which said carrier changes a first command value to a second command value, where
  said first command value internally dividing a region from said reference to a maximum value of said carrier at a ratio between a third value and a fourth value, and
  said second command value internally dividing a region from a minimum value of said carrier to said reference at a ratio between said third value and said fourth value,
  said third value being an output voltage command, and said fourth value being obtained by subtracting said voltage command from said amplitude of said carrier.

5. The power converting apparatus according to claim 4, wherein
said first switch signal is generated by comparing said carrier and a current command having a trapezoidal wave shape to determine a ratio between said first value and said second value; and a slope area of said current command is expressed by $|ds^*|=(1+\sqrt{3}\tan(\phi-\pi/6))/2;$ and $|dt^*|=(1-\sqrt{3}\tan(\phi-\pi/6))/2,$ where ds* and dt* represent a line current conduction rate, a phase angle ø is $0 \leq \phi \leq \pi/3$, and ø represents a phase in an area obtained by equally dividing one cycle of a command signal phase θ into six.

6. The power converting apparatus according to claim 4, wherein
said first switch signal is generated by converting a voltage-source third switch signal into a current-source fourth switch signal, the voltage-source third switch signal being obtained by comparing said carrier and a voltage command having a trapezoidal wave shape to determine a ratio between said first value and said second value; and
a slope area of said voltage command is expressed by
$\sqrt{3}\tan(\phi-\pi/6)$, where a phase angle ø is $\pi/6 \leq \theta \leq \pi/2$; and
$-\sqrt{3}\tan(\phi-\pi/6)$, where a phase angle ø is $7\pi/6 \leq \theta \leq 3\pi/2$, and ø represents a phase in an area obtained by equally dividing one cycle of a command signal phase θ into six.

7. The power converting apparatus according to claim 1, wherein
said carrier is a triangular-wave-shape carrier.

8. The power converting apparatus according to claim 1, wherein
said carrier is a sawtooth-wave-shape carrier.

9. The power converting apparatus according to claim 2, wherein
said carrier is a triangular-wave-shape carrier.

10. The power converting apparatus according to claim 3, wherein
said carrier is a triangular-wave-shape carrier.

11. The power converting apparatus according to claim 4, wherein
said carrier is a triangular-wave-shape carrier.

12. The power converting apparatus according to claim 5, wherein
said carrier is a triangular-wave-shape carrier.

13. The power converting apparatus according to claim 6, wherein
said carrier is a triangular-wave-shape carrier.

14. The power converting apparatus according to claim 2, wherein
said carrier is a sawtooth-wave-shape carrier.

15. The power converting apparatus according to claim 3, wherein
said carrier is a sawtooth-wave-shape carrier.

16. The power converting apparatus according to claim 4, wherein
said carrier is a sawtooth-wave-shape carrier.

17. The power converting apparatus according to claim 5, wherein
said carrier is a sawtooth-wave-shape carrier.

18. The power converting apparatus according to claim 6, wherein
said carrier is a sawtooth-wave-shape carrier.

* * * * *